US010546565B2

(12) United States Patent
Voelker

(10) Patent No.: US 10,546,565 B2
(45) Date of Patent: Jan. 28, 2020

(54) ACOUSTIC DRUM SHELL INCLUDING INSERTS

(71) Applicant: Greg Voelker, Huntington Beach, CA (US)

(72) Inventor: Greg Voelker, Huntington Beach, CA (US)

( * ) Notice: Subject to any disclaimer, the term of this patent is extended or adjusted under 35 U.S.C. 154(b) by 0 days.

(21) Appl. No.: 16/267,133

(22) Filed: Feb. 4, 2019

(65) Prior Publication Data

US 2019/0172430 A1 Jun. 6, 2019

Related U.S. Application Data

(63) Continuation of application No. 15/607,269, filed on May 26, 2017, now Pat. No. 10,199,019, which is a continuation-in-part of application No. 15/092,477, filed on Apr. 6, 2016, now Pat. No. 9,666,172.

(60) Provisional application No. 62/281,173, filed on Jan. 20, 2016.

(51) Int. Cl.
*G01D 13/02* (2006.01)
*G10D 13/02* (2006.01)

(52) U.S. Cl.
CPC ......... *G10D 13/028* (2013.01); *G10D 13/021* (2013.01)

(58) Field of Classification Search
CPC ........................... G10D 13/028; G10D 13/021
See application file for complete search history.

(56) References Cited

U.S. PATENT DOCUMENTS

| | | | | |
|---|---|---|---|---|
| 673,633 A | | 5/1901 | Boulanger | |
| 929,175 A | | 7/1909 | Walberg | |
| 1,420,233 A | * | 6/1922 | Baldwin | G10D 13/028 84/411 R |
| 1,768,438 A | | 6/1930 | Clark | |
| 1,832,227 A | | 11/1931 | Ludwig | |
| 2,546,452 A | | 3/1951 | Kmieliauskas | |
| 2,563,346 A | * | 8/1951 | Livingston | G10D 13/026 84/412 |
| 2,678,573 A | | 5/1954 | Taylor | |
| 2,832,395 A | | 4/1958 | Fisher | |
| 3,215,021 A | | 11/1965 | Kester, Jr. | |
| 3,621,749 A | | 11/1971 | Aluisi | |
| 3,818,791 A | | 6/1974 | Zickos | |
| 3,911,779 A | | 10/1975 | Della-Porta | |

(Continued)

OTHER PUBLICATIONS

Non-Final Office Action dated Dec. 19, 2016, for U.S. Appl. No. 15/092,477, filed Apr. 6, 2016, sixteen pages.

(Continued)

*Primary Examiner* — Robert W Horn
(74) *Attorney, Agent, or Firm* — Morrison & Foerster LLP

(57) ABSTRACT

A metal shell and metal inserts of an acoustic drum. In some examples, an acoustic drum having a metal shell can include one or more metal inserts configured to control the tone of the drum. In some configurations, the one or more inserts can form a portion of a bearing edge at one or more openings of the shell. Moreover, in some examples the inserts can be fitted to be in contact with the shell. The shape and configuration of the metal inserts can therefore control and refine the tone of the drum, allowing, for example, a drum with a metal shell to have a tone resembling that of a wooden drum with the sensitivity and power of a metal drum.

20 Claims, 18 Drawing Sheets

(56) References Cited

U.S. PATENT DOCUMENTS

| | | | | |
|---|---|---|---|---|
| 3,981,220 | A | 9/1976 | Clark | |
| 4,356,757 | A | 11/1982 | Mooy | |
| 4,714,002 | A * | 12/1987 | Cleland | G10D 13/02 84/413 |
| 4,928,565 | A | 5/1990 | Hsieh | |
| 4,970,933 | A | 11/1990 | Hsieh | |
| 5,025,697 | A * | 6/1991 | May | G10D 13/028 84/411 R |
| 5,280,742 | A | 1/1994 | Vergara | |
| 5,353,674 | A * | 10/1994 | Volpp | G10D 13/02 84/411 R |
| 5,517,890 | A * | 5/1996 | Cooperman | G10D 13/023 84/411 R |
| 5,587,544 | A | 12/1996 | Fujii | |
| 5,606,142 | A | 2/1997 | Volpp | |
| 5,675,099 | A | 10/1997 | Granatello | |
| 6,291,752 | B1 * | 9/2001 | Vergara | G10D 13/028 84/104 |
| 6,380,468 | B1 | 4/2002 | Shigenaga | |
| 6,586,665 | B1 | 7/2003 | Liao et al. | |
| 6,909,040 | B1 | 6/2005 | Fredrickson | |
| 7,148,413 | B2 | 12/2006 | May | |
| 7,361,823 | B2 | 4/2008 | Rush | |
| 7,495,160 | B2 | 2/2009 | Hoshino | |
| 7,781,659 | B2 | 8/2010 | Liao | |
| 7,888,574 | B1 | 2/2011 | Acoutin | |
| 7,910,817 | B1 | 3/2011 | Huang | |
| 8,399,754 | B2 | 3/2013 | Koks | |
| 8,563,841 | B1 | 10/2013 | Good | |
| 9,040,796 | B2 | 5/2015 | Yoshino | |
| 9,076,414 | B1 | 7/2015 | Dunnett | |
| 9,378,715 | B2 | 6/2016 | Nigro | |
| 9,653,053 | B2 | 5/2017 | Martin | |
| 9,666,172 | B1 * | 5/2017 | Voelker | G10D 13/028 |
| 10,199,019 | B2 * | 2/2019 | Voelker | G10D 13/028 |
| 2007/0251373 | A1 | 11/2007 | Fadda | |
| 2017/0263223 | A1 | 9/2017 | Voelker | |

OTHER PUBLICATIONS

Non-Final Office Action dated Feb. 14, 2018, for U.S. Appl. No. 15/607,269, filed May 26, 2017,12 pages.

Notice of Allowance dated Mar. 28, 2017, for U.S. Appl. No. 15/092,477, filed Apr. 6, 2016, nine pages.

Notice of Allowance dated Oct. 5, 2018, for U.S. Appl. No. 15/607,269, filed May 26, 2017, nine pages.

Notice of Allowance dated Nov. 30, 2018, for U.S. Appl. No. 15/607,269, filed May 26, 2017, six pages.

* cited by examiner

ACOUSTIC DRUM SHELL INCLUDING INSERTS

CROSS REFERENCE TO RELATED APPLICATIONS

This Application is a continuation of U.S. patent application Ser. No. 15/607,269, filed May 26, 2017, published as U.S. Publication No. 2017-0263223, which is a continuation-in-part of U.S. patent application Ser. No. 15/092,477 filed on Apr. 6, 2016, now issued as U.S. Pat. No. 9,666,172, which claims the benefit of U.S. Provisional Application No. 62/281,173 filed on Jan. 20, 2016, the entire disclosures of which are herein incorporated by reference in their entireties for all intended purposes.

BACKGROUND

Field of the Disclosure

This application relates to components of an acoustic drum, and more particularly, to a metal shell and metal inserts of an acoustic drum.

Background

Drummers may choose their drums based on a variety of tonal characteristics such as timbre, volume, and tuning range. Moreover, drummers may also choose their drums based on practical characteristics such as size, weight, and cost. All of these characteristics of a drum can vary, in part, according to the components constituting the drum and the materials forming those components. Components that can make up a drum generally include a shell, a drum head which is stretched over a top edge of the shell, a hoop which holds the drum head, and tension rods and lugs which adjust the tension on the drum head. A bottom hoop and bottom drum head can also be included, which stretches over a bottom edge of the shell.

Drums can include a bearing edge, which can contribute to the tone of the drum. As used in this disclosure, the term "bearing edge" includes the point at which the head meets the body (e.g., shell) of a drum, but can also include other elements forming an edge at an open end of a drum. For example, the bearing edge can include one or more edges of the drum shell and/or one or more edges of an insert, as will be discussed in detail below. In some examples, a drum shell can have a bearing edge along the top and/or bottom edge of the shell. The characteristics of a bearing edge (e.g., the thickness, shape, and angle or angles of the bearing edge) can affect the vibration of the drum head by, for example, determining the amount of contact between the head and shell and shaping the air movement in the area between the bearing edge and the drum head. In some examples, it can be desirable for a drum to have a bearing edge thick enough to have a desired tone. Moreover, it can be desirable for a drum to have a bearing edge with a specific angle or angles.

The thickness of the shell can also contribute to the tone of the drum. In some examples, a drum having a thinner shell can have a deeper sound and more resonance than a drum having a thicker shell. Thus, in some cases, it can be desirable for a drum to have a thin shell. Further, the material of the shell can also contribute to the tone of the drum. Some drums formed of metal can have a more metallic or "tinny" tone, while some drums formed of wood can have a "warmer" tone. In some cases, it can be desirable for a drum to have a warmer sound.

According to the above, in some examples it can be beneficial for a drum to have the thin shell of a conventional metal drum, but with a less metallic tone, and for the drum to have a thick bearing edge, but one that can accommodate a variety of shapes. In addition, it can be beneficial to manufacture such a drum efficiently and cost-effectively. Some conventional drums formed with a thin metal shell may have the resonance of a thin-shelled drum, but the edge is too thin to accommodate a variety of bearing edge shapes (for example, bearing edge shapes having a thick edge). Although some metal drums can have an edge that is rolled to form a thicker bearing edge, the properties of the materials forming the shell can constrain the shape and angles of the bearing edge. Some drums formed with a wooden shell may have a warm sound, but must have a thicker shell or reinforcing rings in order to retain their shape and accommodate a variety of bearing edges. Moreover, drums with wooden shells can be more complex to manufacture than drums with metal shells due to the ease with which metal can be formed and joined. Therefore, it can be beneficial to have a drum configuration and corresponding manufacturing process to form a drum having a thin metal shell, but with a less metallic tone, and for the drum to have a thicker edge (e.g., an edge formed by a shell and an insert), which can accommodate a variety of bearing edge shapes.

SUMMARY OF THE DISCLOSURE

Drummers may choose their drums based on a variety of tonal characteristics such as timbre, volume, and tuning range. Moreover, drummers may also choose their drums based on practical characteristics such as size, weight, and cost. All of these characteristics of a drum can vary, in part, according to the components constituting the drum and the materials forming those components. In some examples, it can be beneficial to have a drum configuration and corresponding manufacturing process to form a drum having a thin metal shell, but with a less metallic tone, and for the drum to have a thicker bearing edge which can accommodate a variety of bearing edge shapes. In addition, it can be beneficial to manufacture such a drum efficiently and cost-effectively. This application relates to components of an acoustic drum, and more particularly, to a metal shell and metal inserts of an acoustic drum. In some examples, an acoustic drum having a metal shell can include one or more metal inserts configured to control the tone of the drum. In some configurations, the one or more inserts can form a portion of a bearing edge at one or more openings of the shell. Moreover, in some examples the inserts can be fitted to be in contact with the shell. The shape and configuration of the metal inserts can therefore control and refine the tone of the drum, allowing, for example, a drum with a metal shell to have a tone resembling that of a wooden drum with the sensitivity and power of a metal drum.

DETAILED DESCRIPTION

In the following description, reference is made to the accompanying drawings which form a part hereof, and in which it is shown by way of illustration specific examples which can be practiced. It is to be understood that other examples can be used and structural changes can be made without departing from the scope of the examples of this disclosure. Moreover, illustrations should not be understood to be to scale, and in some illustrations, dimensions may be exaggerated for ease of illustration.

This application relates to components of an acoustic drum, and more particularly, to a metal shell and metal inserts of an acoustic drum. In this application, the term “shell” is used to reference the body (or resonator) of an acoustic drum. According to some examples of the disclosure, an acoustic drum having a metal shell can include one or more metal inserts configured to control the tone of the drum. In some configurations, the one or more inserts can form a portion of a bearing edge at one or more openings of the shell. Moreover, the inserts can be fitted to be in contact with the inner wall of the shell. The shape and configuration of the metal inserts can therefore control and refine the tone of the drum, allowing, for example, a drum with a metal shell to have a tone resembling that of a wooden drum with the sensitivity and power of a metal drum.

Figure 1:
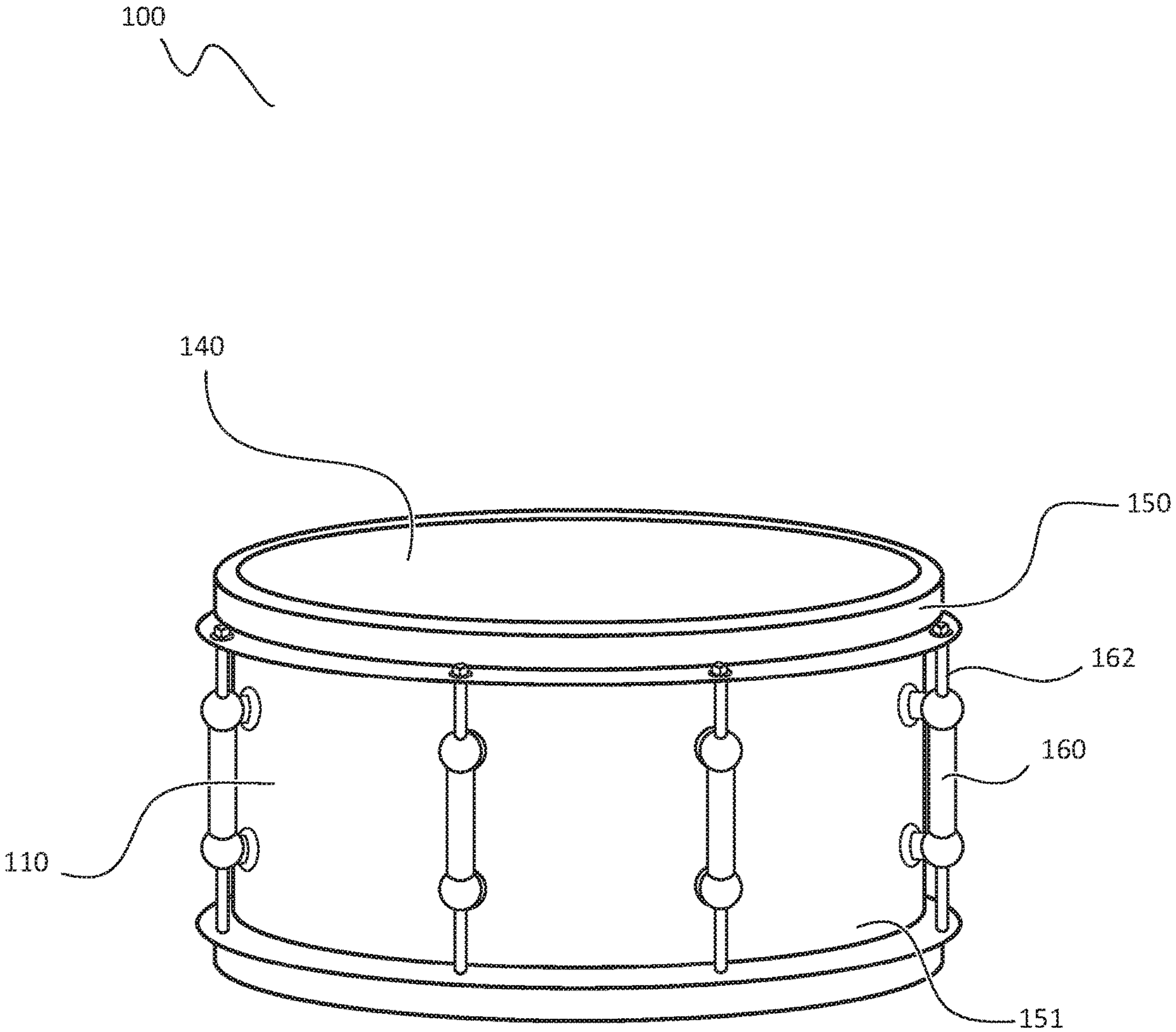
FIG. 1 illustrates an example drum, which can include one or more drum inserts according to examples of the disclosure.

FIG. 1 illustrates an example drum 100, which can include one or more drum inserts according to examples of the disclosure. As shown, drum 100 can comprise a shell 110. A drum head 140 can be held by a drum hoop 150. Hoop 150 can be held in place by a plurality of tension rods 162, each mounted through a hole in the hoop, and each tension rod can be received by a lug 160, which can be attached to shell 110. As tension is increased on hoop 150 using tension rods 162, head 140 is stretched over a top edge (not visible) of the shell 110. Drum 100 can further include a bottom hoop 151 with a bottom head (not visible). In some examples, shell 110 can be formed of a rectangular section of sheet metal (e.g., aluminum), rolled end-to-end into a cylinder, as shown. Details of the assembly of drum 100, including shell 110, will be discussed in more detail below. For ease of explanation, the examples described herein refer to shells and inserts in the context of the example drum shown in FIG. 1, however, it should be understood that the scope of this disclosure is not so limited. For example, the same configurations described herein may be employed in other drum configurations which include a shell and head, but which do not include tension rods, hoops, bottom heads, etc.

Drum head 140 can be held in contact with an edge (not shown) of shell 110 by hoop 150. As tension increases on hoop 150, head 140 is stretched over the top edge of shell 110. As will be explained, the top edge of shell 110 can include a bearing edge, which can affect the vibration of the head, and therefore, the tone of the drum. Moreover, the bearing edge can impact the ability to tune drum 100. As discussed above, in some circumstances, it can be beneficial to have a bearing edge such that head 140 makes contact with a top edge of shell 110, but also such that the edge is wide enough (i.e., the material or materials forming the bearing edge are thick enough) to achieve a desired sound. Accordingly, it can be beneficial to include one or more inserts along an inside surface of shell 110 such that the inserts form a portion of the bearing edge. Moreover, it can be beneficial to reduce the metallic timbre which can be associated with metal drums by securing the inserts snugly to the inside surface of shell 110. The function and example configurations of these inserts will now be described in more detail with reference to FIGS. 2-7 below.

Figure 2A:
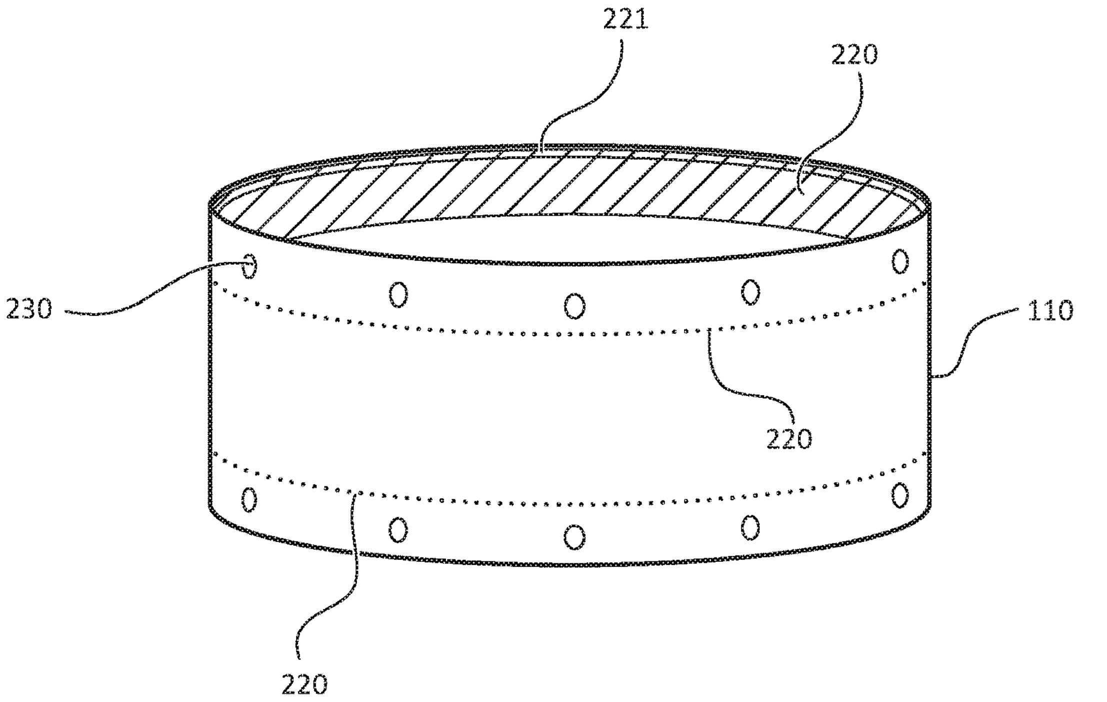
FIGS. 2A-2B illustrate simplified views of elements of the example drum of FIG. 1, including a shell, drum inserts, and fasteners according to examples of the disclosure.
Figure 2B:
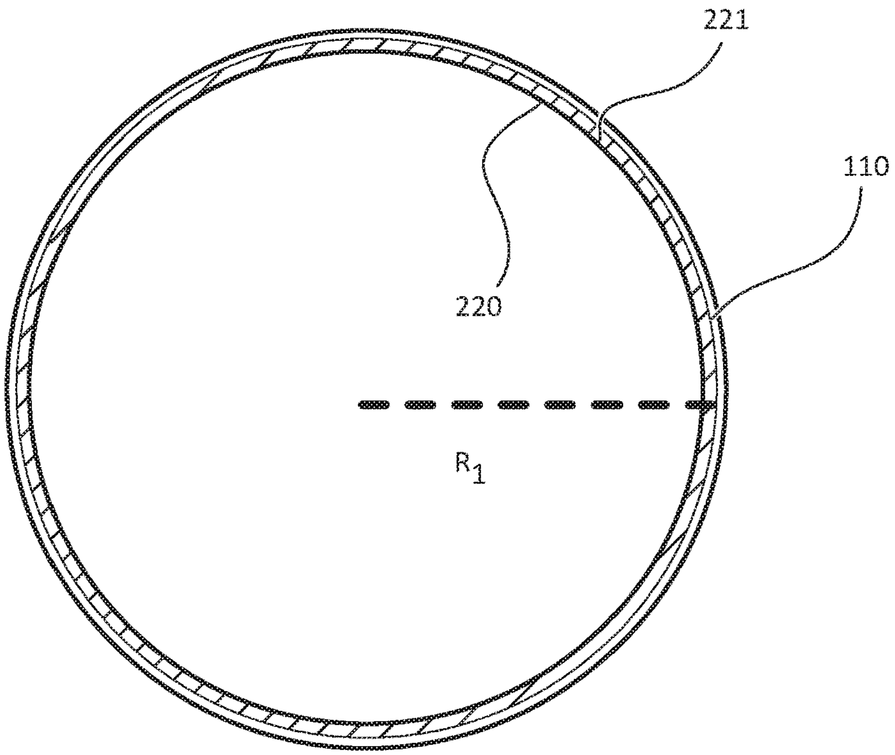

FIGS. 2A-2B illustrate a simplified view of elements of example drum 100 of FIG. 1, including shell 110, but with added drum insert 220 and fasteners 230 according to examples of the disclosure. FIG. 2A shows a perspective view of elements of drum 100, while FIG. 2B shows a top view. For clarity, other elements of drum 100 are omitted. In addition, portions of insert or inserts 220 which are not visible from the perspective view are indicated by a dotted line. It should be noted that FIGS. 2A and 2B are provided as an introduction to the examples that will be explained in more detail with references to FIGS. 3-7 below. Thus, although in the example shown in FIGS. 2A-2B, the insert 220 is illustrated as a continuous ring, it should be noted that the scope of this disclosure includes examples where an insert is not continuous, or where multiple inserts are utilized. Accordingly, the description of FIGS. 2A-2B below refers to “insert or inserts 220” to acknowledge these different configurations.

As illustrated, drum 100 can include insert or inserts 220 near the top and optionally also the bottom edge of shell 110. As mentioned above, in some examples, shell 110 can be formed of a rectangular section of sheet metal, rolled end-to-end into a cylinder. For example, shell 110 can be formed of steel, stainless steel, aluminum, or some other sheet metal, which has been seam welded. The type of metal used to form shell 110 may be selected based on, for example, tonal quality, strength, cost, and ease of use in manufacturing. In some examples, insert or inserts 220 can be formed of a metal, which is rolled end-to-end to form a ring, though in other examples, the ring may be made up of one or more segments, as will be explained below. Insert or inserts 220 can form a ring (either alone or collectively) having a radius R1, radius R1 also being approximately equal to an inner radius of the shell. Insert or inserts 220 can be formed of a metal, either the same or different as the metal used to form shell 110. For example, insert or inserts 220 can be formed of steel, aluminum, or some other metal. Insert or inserts 220 can be fastened to shell 110 using one or more fasteners 230, though it should be understood that in other configurations, insert or inserts 220 may be fixed in place using welding, brazing, or adhesive. However, fasteners 230 can be used, for example, when shell 110 and insert or inserts 220 are formed of different metals, and welding is not possible due to the dissimilarity of metals. Fasteners 230 can comprise any combination of suitable fasteners such as rivets, machine screws, and the like. In some examples, a gasket (e.g., a cellulose or vegetable fiber gasket) can be positioned between shell 110 and inserts 220, which can result in additional dampening and tone control.

As will be explained in detail, an edge portion of shell 110 can form a portion of a bearing edge 221 around the circumference of the shell. Moreover, a portion of insert 220 can also form a portion of the bearing edge 221 around the circumference of the shell. In some examples, the bottom edge of shell 110 can also include a bottom insert or inserts 220. Further, in some configurations the bottom edge of shell 110 and a bottom insert or inserts 220 can also each form a portion of a bearing edge around the circumference of shell 110, which may be of the same or different configuration than that of the top edge and insert or inserts 220.

In some examples wherein drum 100 includes snare wires (e.g., when the drum is a snare drum), bottom insert or inserts 220 can be configured to include snare beds (not shown). Snare beds can affect how snare wires of the drum sit against the bottom drumhead. Therefore, the tone of a snare drum can be determined, at least in part, by the configuration of the snare beds. In some wooden drums, snare beds can be formed by removing a portion of the bottom edge of the drum shell, for example, by filing, sanding, or carving the edge. However, in some conventional metal drums, particularly those with a thin metal shell, snare beds must be pressed, hammered, or rolled into the bottom edge of the shell due to the thinness of material. In some cases, it can be desirable to have snare beds that are formed by removing material from the drum rather than reshaping the drum using hammering or pressing. Accordingly, in some examples, the bottom edge of the shell and/or bottom inserts 220 of drum 100 can have material removed to form snare beds. In some examples, material can be removed by filing, sanding, routing, and the like. In some examples, snare beds can be formed before the bottom insert or inserts 220 are attached to shell 110; in other examples, snare beds can be formed after attaching the insert or inserts to the shell.

Figure 3A:
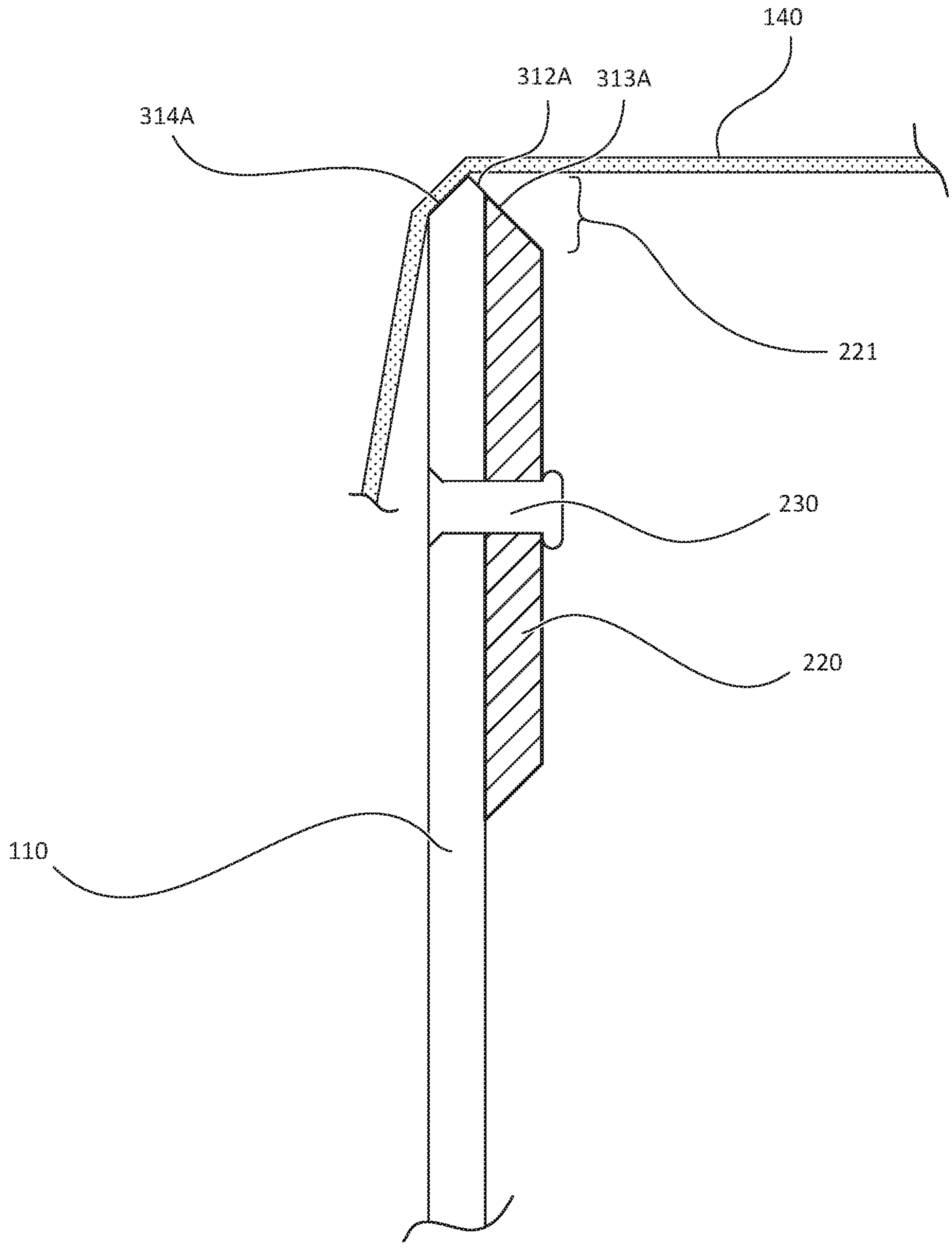
FIGS. 3A-3D illustrate cross-sectional views of a section of an example drum along a plane perpendicular to the head surface extending radially from the center of the drum according to examples of the disclosure.
Figure 3B:
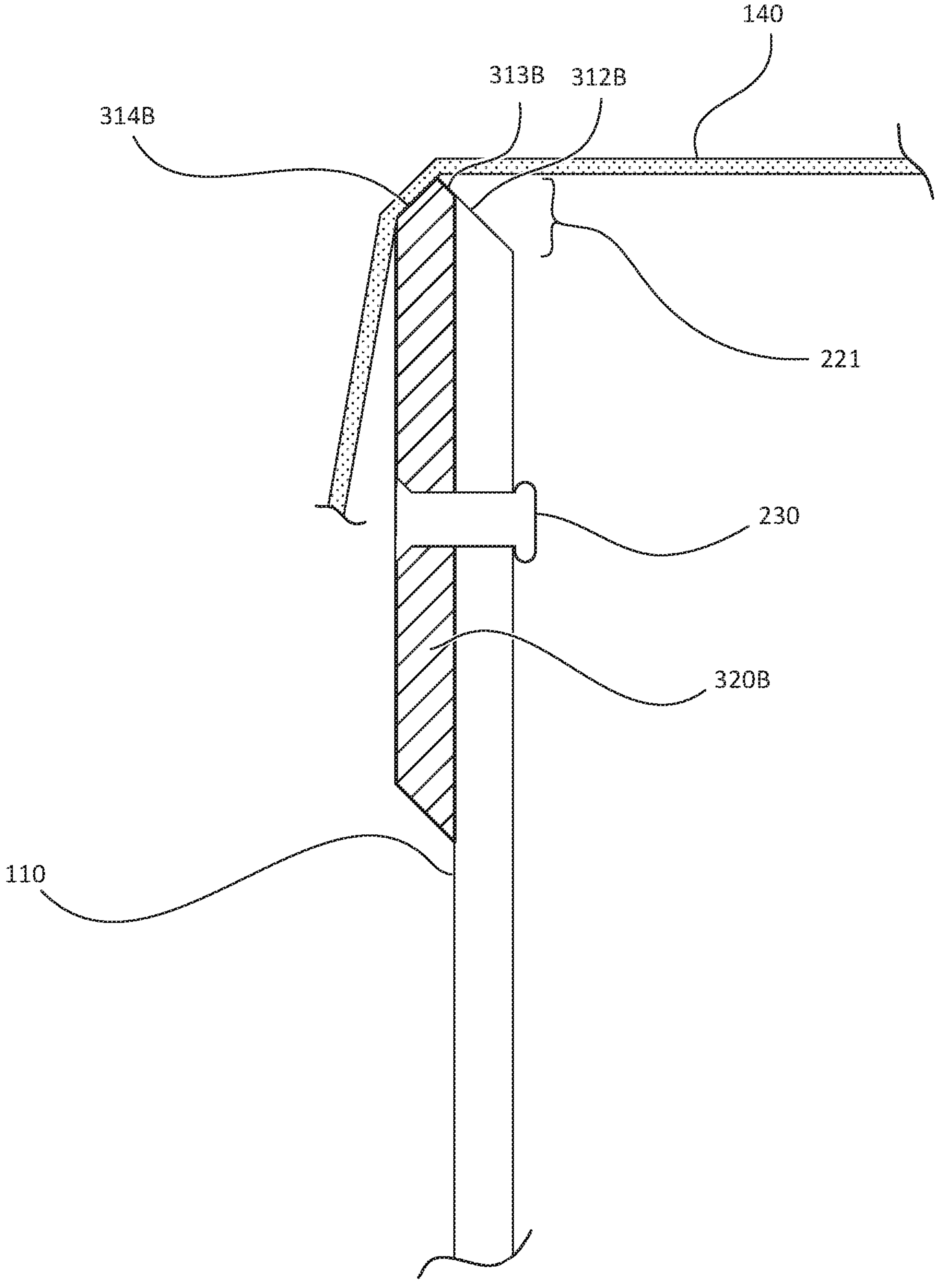
Figure 3C:
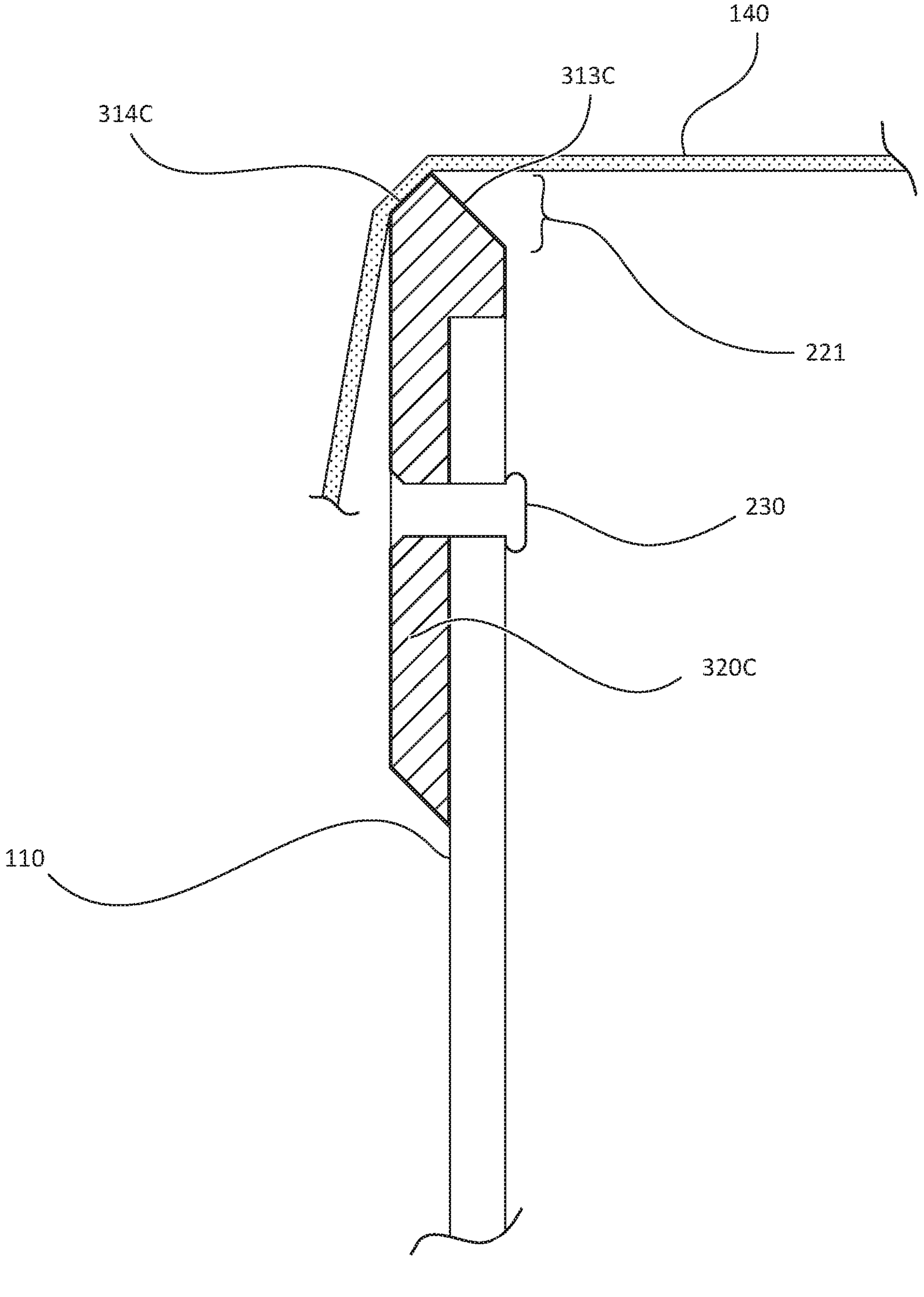
Figure 3D:
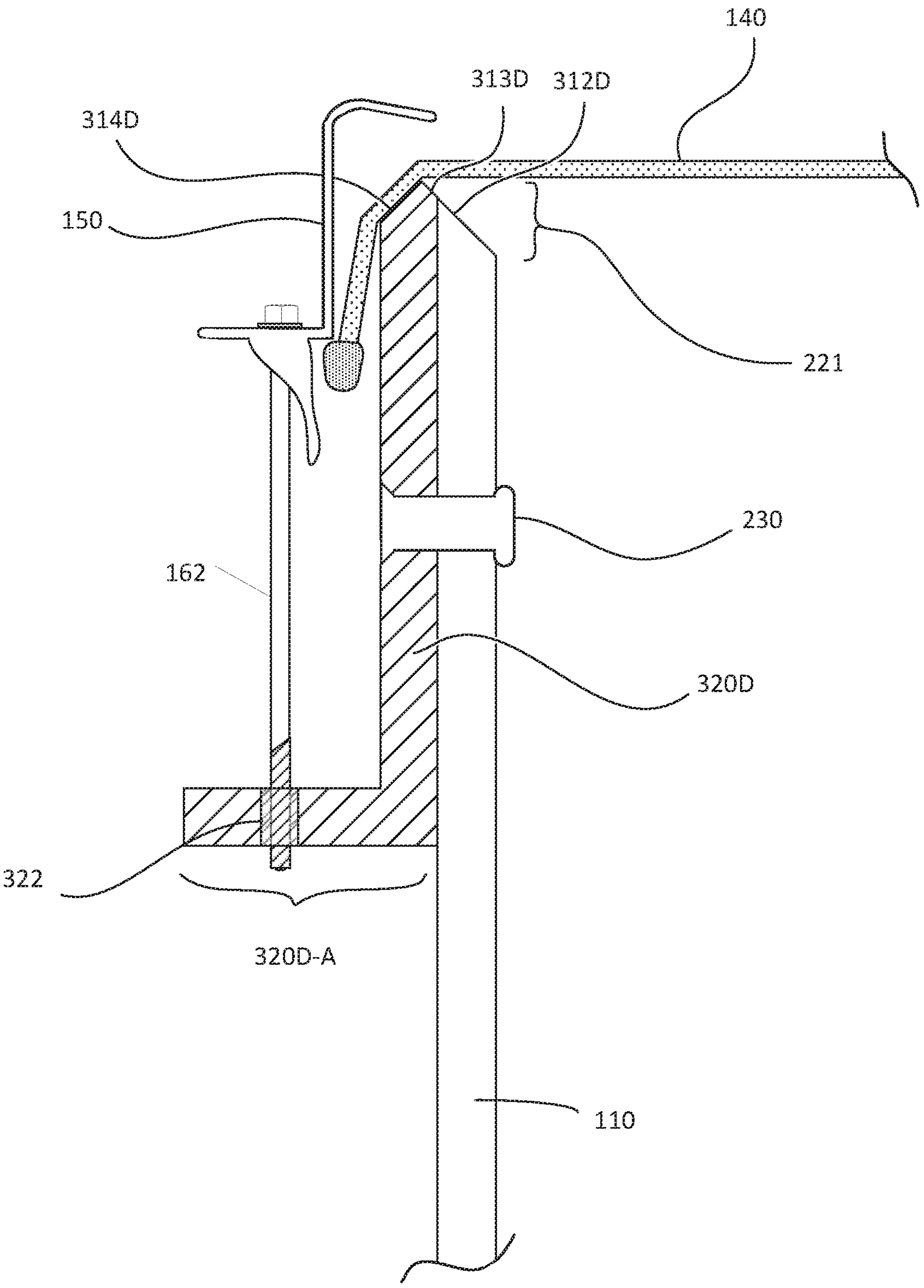

FIGS. 3A-3D illustrate cross-sectional view of a section of example drum 100 along a plane perpendicular to the head surface extending radially from the center of the drum according to examples of the disclosure. FIGS. 3A-3C each illustrate shell 110, insert 220, fastener 230, and drum head 140. FIG. 3D also illustrates tension rod 162 and hoop 150. Other elements are omitted from the illustrations for clarity.

FIG. 3A illustrates a cross-sectional view of a section of example drum 100 including an insert 220. As illustrated, head 140 is stretched over the top edge of shell 110. In some circumstances, it can be desirable for tonal quality of drum 100 to have drum head 140 make initial contact with shell 110 such that hits to the drum head initially excite shell 110. That is, it can be desirable to form shell 110 and insert 220 such that a portion 312A of the shell 110 forms an upper part of a bearing edge 221, and a portion 313A of insert 220 forms the lower part of the bearing edge 221, where the upper part of the bearing edge is in contact with drum head 140. In some configurations, bearing edge 221 can be further configured to have an outer edge 314A of shell 110, with which drum head 140 makes further contact (i.e., an offset bearing edge). In the example configuration shown in FIG. 3A, the outside edge 314A can be thinner than the inside edge formed by portions 312A and 313A.

FIG. 3B illustrates a cross sectional view of a section of example drum 100 including an "insert" 320B (so named for convenience of reference) located on the outside (e.g., outer surface) of shell 110. As illustrated, in this configuration, drum head 140 makes initial contact with insert 320B in contrast to the configuration described above with reference to FIG. 3A above, wherein the drum head makes initial contact with shell 110. Accordingly, the tonal quality of the drum configuration shown can be different from that in FIG. 3A. Nevertheless, in some circumstances, it can be desirable for the tonal quality of drum 100 to form shell 110 and insert 220 such that a portion 312B of the shell 110 forms a lower part of a bearing edge 221, and a portion 313B of insert 320B forms the upper part of the bearing edge 221, where the upper part of the bearing edge is in contact with drum head 140. As similarly described above with reference to FIG. 3A, in some configurations, bearing edge 221 can be further configured to have an outer edge 314B of insert 320B, with which drum head 140 makes further contact (i.e., an offset bearing edge). In the example configuration shown in FIG. 3B, the outside edge 314B can have less surface area than the inside edge formed by portions 312B and 313B. In configurations where fastener 230 is removable (e.g., when inserts are attached using bolts and nuts), insert 320B can be removable, allowing drum 100 to be configured with different bearing edge shapes.

FIG. 3C illustrates a cross sectional view of a section of example drum 100 including an "insert" 320C (so named for convenience of reference) located on the outside and top of shell 110. As illustrated, in this configuration, drum head 140 makes initial contact with insert 320C as in the configuration described above with reference to FIG. 3B above. In some circumstances, it can be desirable for the tonal quality of drum 100 to form shell 110 and insert 320C such that a portion 313C of the shell 110 forms an inner edge of bearing edge 221, where the upper part of the bearing edge is in contact with drum head 140. In some configurations, bearing edge 221 can be further configured to have an outer edge 314C of insert 320C, with which drum head 140 makes further contact (i.e., an offset bearing edge). In the example configuration shown in FIG. 3C, the outside edge 314C can have less surface area than the inside edge formed by portion 313C. As also explained above with reference to FIG. 3B, in configurations where fastener 230 is removable (e.g., when inserts are attached using bolts and nuts), insert 320C can be removable, allowing drum 100 to be configured with different bearing edge shapes.

FIG. 3D illustrates a cross sectional view of a section of example drum 100 including an "insert" 320D (so named for convenience of reference) located on the outside and top of shell 110. As illustrated, in this configuration, drum head 140 makes initial contact with insert 320D as in the configuration described above with reference to FIG. 3B. In some circumstances, it can be desirable to form insert 320D out of an L-shaped bar such that lower portion 320D-A of insert 320D extends out horizontally, as described in further detail below. While FIG. 3D illustrates lower portion 320D-A extending out horizontally at 90 degrees relative to shell 110, it is important to note that lower portion 320D-A can extend out horizontally at different angles relative to shell 110 (e.g., between 0 and 180 degrees). In some configurations, lower portion 320D-A of insert 320D can be used to replace lugs 160 of FIG. 1. For example, as illustrated, lower portion 320D-A of insert 320D can include threaded inserts 322 to receive tension rods 162 (e.g., to control tension between head 140 and hoop 150 as described above with reference to FIG. 1). In some circumstances, replacing lugs 160 with lower portion 320D-A can simplify the manufacturing process, make drum 100 lighter, and/or change the tonal quality of drum 100 by, for example, requiring less materials. In the example configuration shown in FIG. 3D, bearing edge 221 is formed by portion 312D of the shell 110 and a portion 313D of insert 220, as described above with reference to FIG. 3B. As also explained above with reference to FIG. 3B, in configurations where fastener 230 is removable (e.g., when inserts are attached using bolts and nuts), insert 320D can be removable, allowing drum 100 to be configured with different bearing edge shapes. In some examples, bearing edge 221 can be formed by insert 320D, as discussed above with reference to FIG. 3C.

In addition to the acoustic advantages provided by forming a bearing edge using shell 110 and insert 220, the insert can further be configured to control the resonance, and thus tone, of the drum. For example, drums having shells formed of rolled sheet metal (as in the example shown in FIG. 3) by nature can have a metallic or “tinny” timbre. This attribute can be especially noticeable in drums with shells made of thin metal. By fastening one or more inserts, such as insert 220 to shell 110, the metallic timbre can be dampened such that the drum timbre more closely resembles that of a drum having a wooden shell with the volume range and sensitivity of a drum having a metal shell. In all examples described herein, the precise attributes of inserts described can be selected to achieve a desired sound. For example, the thickness, width, and material of the insert or inserts, the fasteners used, and the pressure with which the fastener holds the insert or inserts against the shell can all affect the sound of a drum.

In the example configuration shown in FIGS. 3A-3D, both inside and outside bearing edges are at 45 degrees (i.e., an “offset 45” configuration); however, it should be understood that this concept can be extended to any arbitrary bearing edge. For example, shell 110 and insert 220 can form bearing edges including, but not limited to, offset bearing edges having different angles, offset bearing edges having a round-over portion, rounded bearing edges (including configurations in which an outside bearing edge is of a different radius than an inside bearing edge), other combinations of these configurations, and the like. Moreover, in some configurations, shell 110 and insert 220 may be formed such that insert 220 forms the upper portion of a bearing edge, and shell 110 forms a lower portion of a bearing edge.

In some configurations, fasteners 230 can fasten an insert to shell 110 through one or more holes formed in the insert and shell 110. In these examples, inserts can be formed such that the holes are elongated in a vertical direction (i.e., along the cylinder wall of shell 110), which can allow the inserts to be adjusted in the vertical direction before being fastened to the shell, as will be discussed in more detail with reference to FIGS. 7A-7B below. This can be beneficial, for example, in ensuring that drum 100 has a desired bearing edge, such as the bearing edge 221 formed by portions 314A, 312A, and 313A in FIG. 3A above.

It should be understood that, in all examples in the disclosure, shell 110 can be formed of any thickness appropriate to achieve the desired characteristics of drum 100. For instance, the thickness of shell may depend at least in part on the desired strength and tone of the drum. Similarly, the thickness of the shell may vary based on the material used for shell 110. For example, in some cases, a shell formed of a relatively soft metal (e.g., aluminum) may be thicker than a shell formed of a relatively hard metal (e.g., steel). Likewise, the thickness of insert 220 may vary depending on the material used and desired characteristics of the drum. Moreover, as set forth above, the details of fastener 230 may vary based on the desired application.

Various example configurations of drum inserts will now be discussed with reference to FIGS. 4-7 below. The details of the manufacturing process of the example shells and inserts described herein will be discussed with more specificity with reference to FIGS. 9-11 below.

Figure 4A:
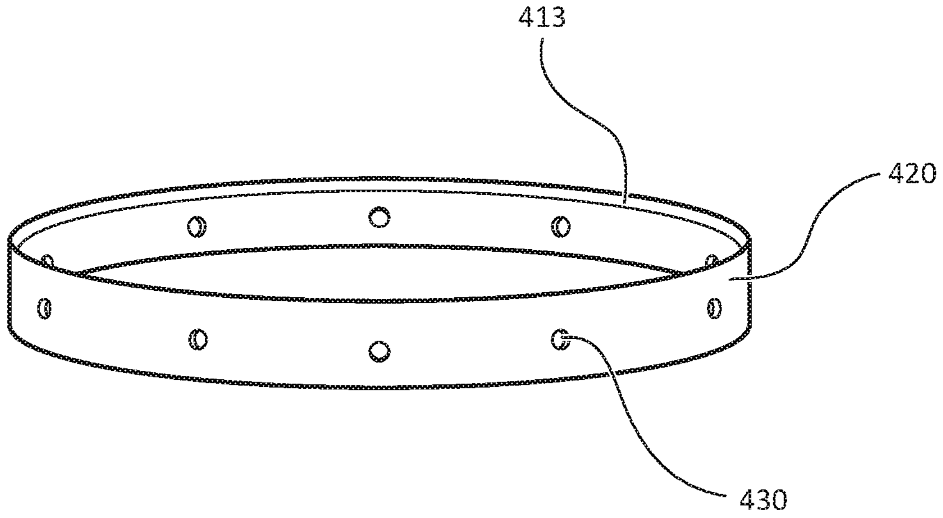
FIGS. 4A-4B illustrate an example configuration of a drum insert forming a ring according to examples of the disclosure.
Figure 4B:
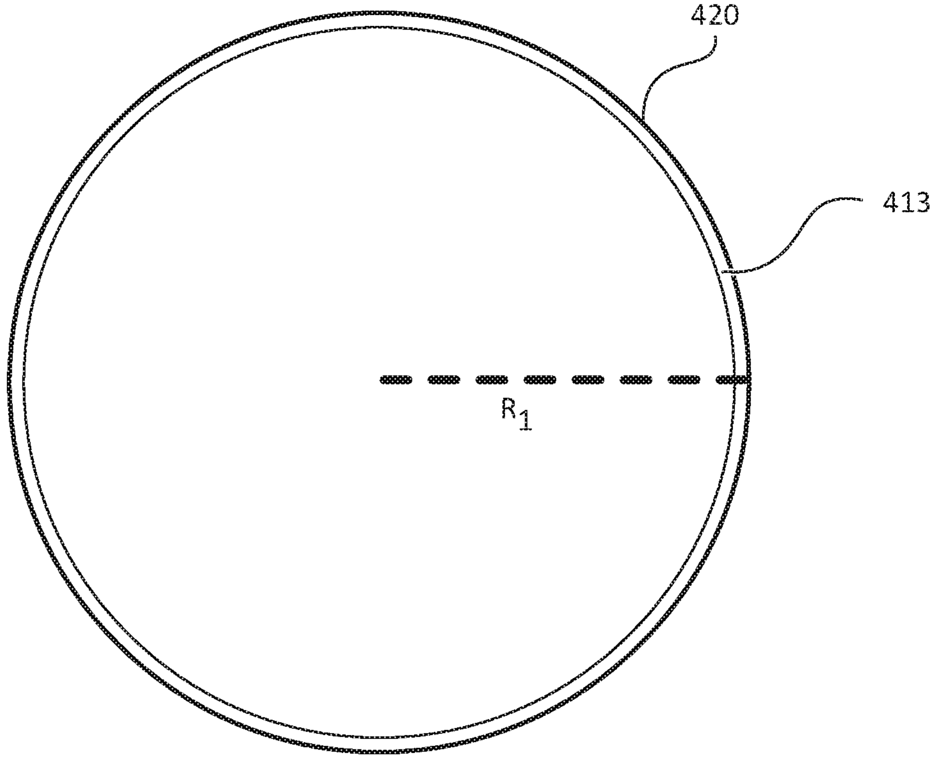

FIGS. 4A-4B illustrate an example configuration of a drum insert forming a ring according to examples of the disclosure. FIG. 4A illustrates a perspective view of insert 420, and FIG. 4B illustrates a top view. As shown, insert 420 can comprise a ring having a beveled edge 413, which can form a portion of a bearing edge 221, as described above with reference to FIG. 3A. In the configuration shown in FIG. 4B, insert 420 can be a complete ring having a radius R1, radius R1 being approximately equal to an inner radius of the shell. Insert 420 can be formed, for example, by rolling a solid bar of metal end-to-end, and attaching the two ends of the bar forming the insert together. In some examples, the ends of the bar forming insert 420 can be connected by welding or brazing the bar at the seam between the two ends. As shown in FIG. 4A, insert 420 can also include a plurality of holes 430 allowing for a fastener (which can correspond to fastener 230 shown in FIG. 3A) to attach the insert to a drum shell (e.g., shell 110 shown in FIG. 3A).

Figure 5A:
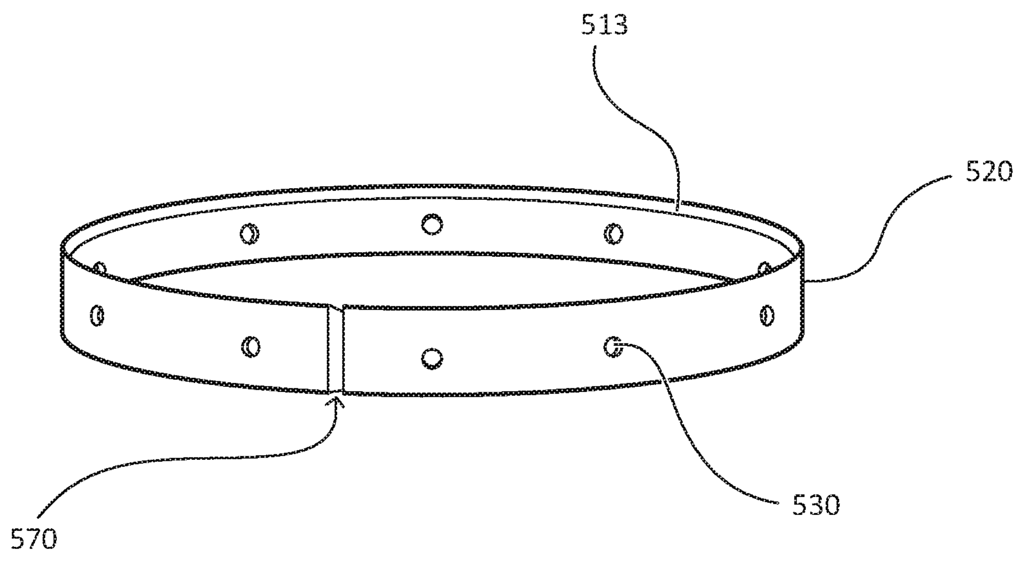
FIGS. 5A-5B illustrate another example of a drum insert, wherein the insert forms a ring having a break according to examples of the disclosure.
Figure 5B:
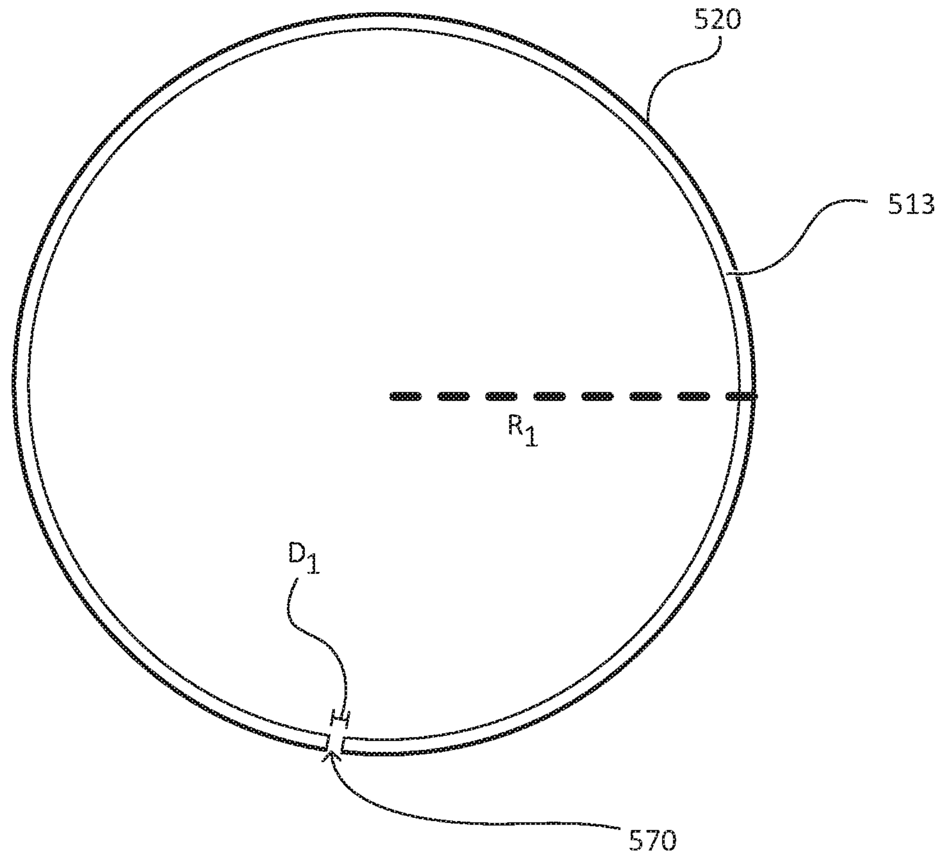

FIGS. 5A-5B illustrate another example of a drum insert, wherein the insert forms a ring having a break according to examples of the disclosure. FIG. 5A illustrates a perspective view of insert 520, and FIG. 5B illustrates a top view. Each point of insert 520 can be curved with a radius R1, approximately equal to the inner radius of a shell. Insert 520 can be similar to insert 420 illustrated in FIGS. 4A-4B in that the insert can include a beveled edge 513 and holes 530 for fasteners (e.g., 230 illustrated in FIGS. 2A-2B and 3). However, rather than the insert forming a continuous ring, insert 520 can include a break 570 having a distance D1. It should be noted that break 570 illustrated in FIGS. 5A-5B is shown with a relatively large distance D1 between the two ends of insert 520 for clarity of illustration; however, in other configurations, distance D1 can range from 0 (i.e., when the ends are touching) to approximately 3 centimeters. In some configurations, distance D1 can be greater than 1 millimeter. In some configurations the outer circumference of insert 520 can match the inner circumference of shell 110 such that the two ends of insert 520 are in contact with one another, but are not joined (e.g., by a method such as welding or brazing). In other configurations, break 570 can comprise a gap such that the two ends of insert 520 are not in contact with one another. In some circumstances, having a break in the insert 520 can simplify the manufacturing process by, for example, eliminating the additional step of joining the ends of the insert together and, in some examples, making the insert easier to position inside of the shell. The insert 520 configuration described with reference to FIGS. 5A-5B can be beneficial, for example, where inserts are utilized primarily or additionally for tone control, rather than primarily for reinforcement of the shell (e.g., drums in which a metal shell is sufficiently strong without reinforcement rings). Moreover, it should be appreciated that in examples where beveled edge 513 forms a bottom portion of a bearing edge, insert 520 does not contact the drum head (as shown in FIG. 3A), thus, a break 570 in insert 520 can have a minimal effect on the sound of the drum.

Figure 6A:
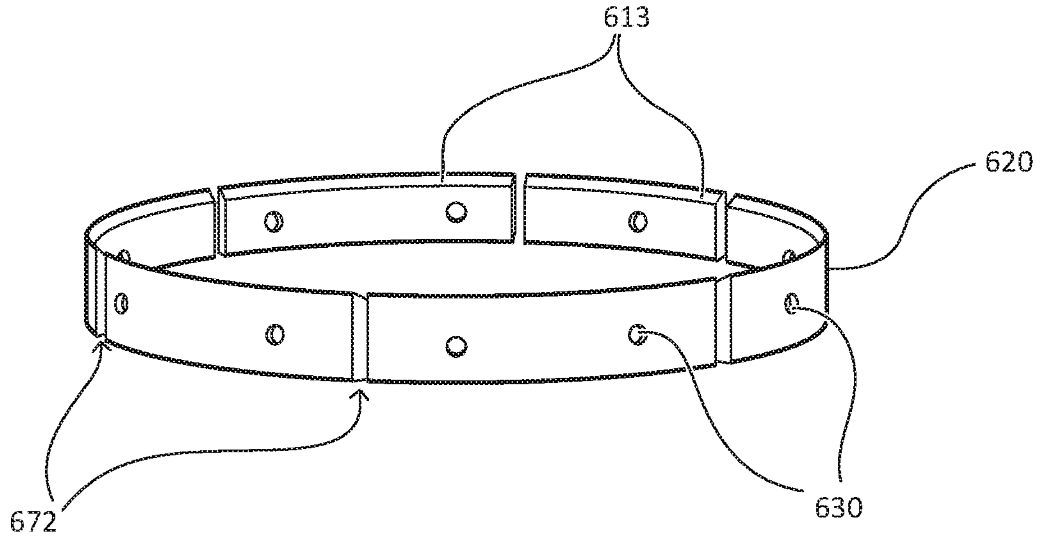
FIGS. 6A-6B illustrate another example of drum inserts, wherein the inserts collectively form a ring having a plurality of breaks according to examples of the disclosure.
Figure 6B:
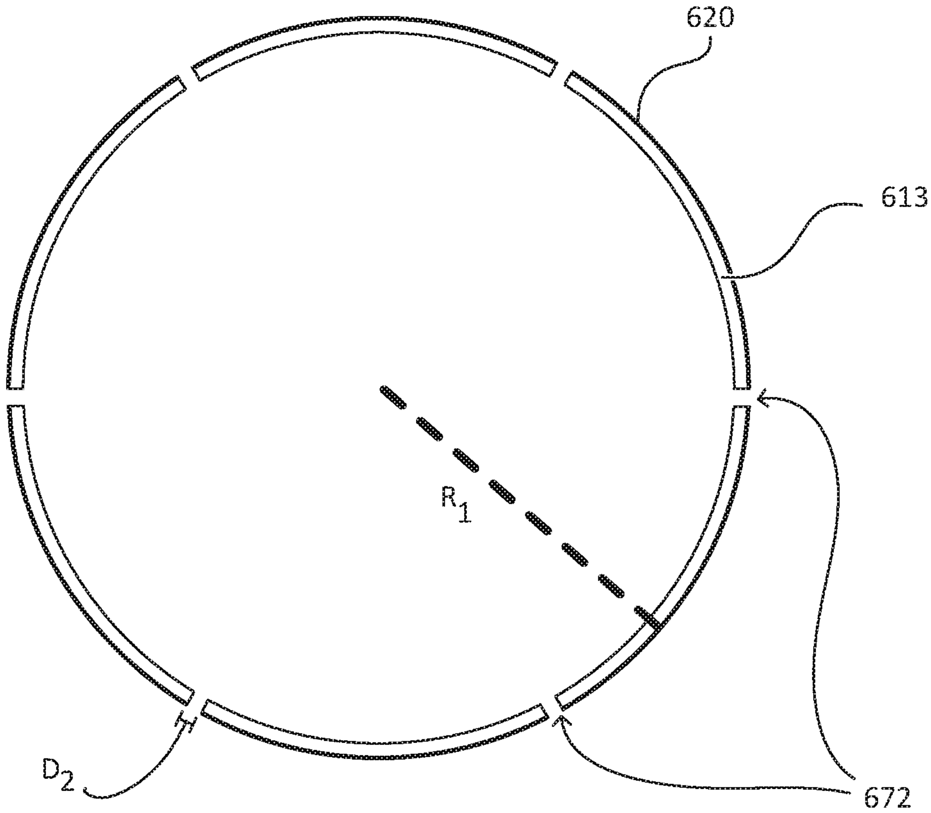

FIGS. 6A-6B illustrate another example of a drum insert formed of a plurality of insert sections, wherein the insert sections collectively form a ring having a plurality of breaks according to examples of the disclosure. FIG. 6A illustrates a perspective view of insert sections 620, and FIG. 6B illustrates a top view. Insert sections 620 can be similar to insert 520 illustrated in FIGS. 5A-5B, including a beveled edge 613 along each of the insert sections 620, and holes 630 to fasten the inserts to a drum shell (e.g., fastener 230 and shell 110 shown in FIG. 2). Insert sections 620 can collectively form a ring along the inner circumference of a drum shell. However, rather than a single insert as shown in the examples of FIGS. 5A-5B, a plurality of insert sections 620 can be attached to a shell, each separated from one another by a break 672. As shown, each insert section 620 can be curved with a radius R1 approximately equal to the inner radius of the shell. Each insert section 620 can be separated by a break having a distance D2, though in other configurations, the distances between insert sections may not be uniform. In addition, in some examples, the distance between one or more of insert sections 620 can be zero, that is, insert sections 620 can be touching one another without being joined (e.g., using welding or brazing). In other examples, the distance D2 between one or more insert sections 620 can be greater, for example, ranging from 1 millimeter to 3 centimeters. The example of FIGS. 6A-6B illustrates a configuration that includes six insert sections 620, though it should be understood that any number of inserts or insert sections can be utilized, including configurations in which only two insert sections are utilized, each essentially forming half of a ring.

As with the example of FIGS. 5A-5B, configurations which utilize multiple insert sections 620 can simplify the manufacturing process by, for example, eliminating the step of joining inserts together. Moreover, insert sections 620 can be more easily positioned in a shell than examples utilizing a single insert joined to make a continuous ring, as in the examples of FIGS. 4A-4B. Further, the relatively small possible size of insert sections 620 configurations can also simplify the manufacturing process. For example, each insert section 620 can be formed as to have a curve with radius R1 using, for example, a press and die, rather than requiring rolling tools. Moreover, as will be explained in more detail below, because insert sections 620 can be relatively small, the curve can also be formed, for example, during an extrusion process. Despite these advantages, it should be noted that insert sections 620 can also be formed by first forming a ring similar in shape to insert 520 shown in FIGS. 5A-5B, and subsequently separating the ring into the multiple insert sections shown in FIGS. 6A-6B.

As with the example of FIGS. 5A-5B, the configuration of insert sections 620 described with reference to FIGS. 6A-6B can be beneficial, for example, where insert sections 620 are utilized primarily or additionally for tone control, rather than only for structural reinforcement of the shell (e.g., drums in which a metal shell is sufficiently strong without reinforcement rings). Also as similarly described, it should be appreciated that in examples where beveled edge 613 forms a bottom portion of a bearing edge, and thus does not contact the drum head, breaks 672 between insert sections 620 can have a minimal effect on the sound of the drum.

Figure 7A:
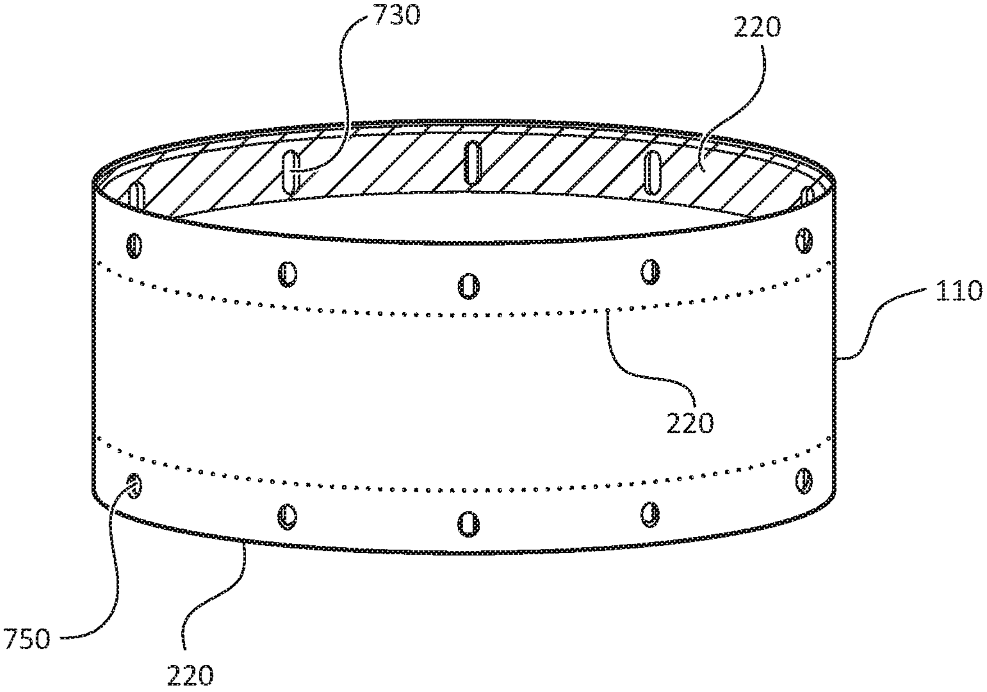
FIGS. 7A-7B illustrate an insert having elongated holes for fasteners according to examples of the disclosure.
Figure 7B:
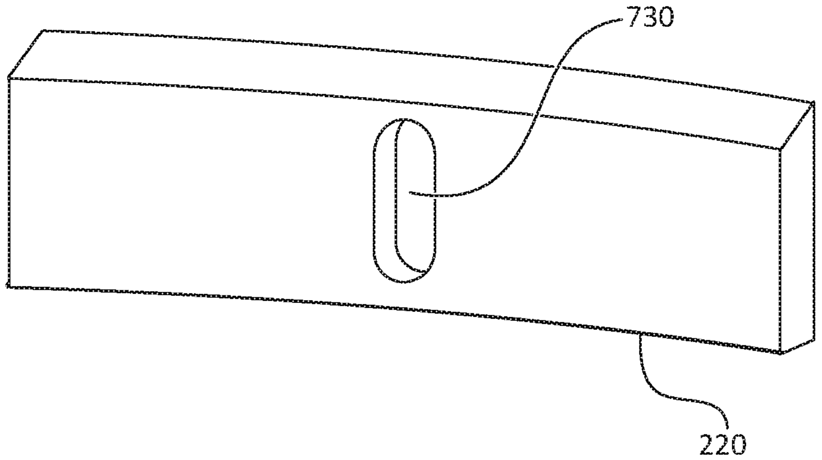

FIGS. 7A-7B illustrate an insert having elongated holes for fasteners according to examples of the disclosure. As discussed above, for example, with reference to FIG. 2A, in some examples, inserts can be attached to shell 110 via plurality of fasteners and holes. In some examples, it can be beneficial to allow the insert (or insert sections) to move vertically (i.e., along the cylinder wall of shell 110), which can allow the insert or inserts to be adjusted in the vertical direction before being securely fastened to the shell. For example, in some cases, it can be beneficial to first tentatively fasten an insert to a shell (e.g., with a fastener hand-tightened) such that the insert can be adjusted with moderate force, but otherwise holds its position. This can be beneficial, for example, to first precisely line up a shaped edge of an insert with an edge of the shell, and subsequently tighten the fastener to more permanently hold the insert in place. In some cases, it can also be beneficial to adjust the insert in order to alter the tone of the drum to the liking of a user. In examples where removable fasteners (e.g., nuts and bolts) are used, the inserts can be adjusted repeatedly.

FIG. 7A illustrates a perspective view of a drum shell 110 and insert 220 in a configuration in which insert 220 (or insert sections) can have elongated holes 730. FIG. 7B illustrates a perspective view of an example insert 220 which has an elongated hole 730. In the configuration shown, the holes 750 in shell 110 can be round, while the holes 730 of insert 220 can be elongated; however, it should be understood that in some configurations, the insert and/or the drum shell 110 can have elongated holes to allow for vertical adjustment of the insert. Moreover, though not shown here, in other examples, holes 730 can be elongated in a horizontal direction (i.e., in the circumferential direction of the shell), which can allow the insert or inserts to be further adjusted.

Figure 7C:
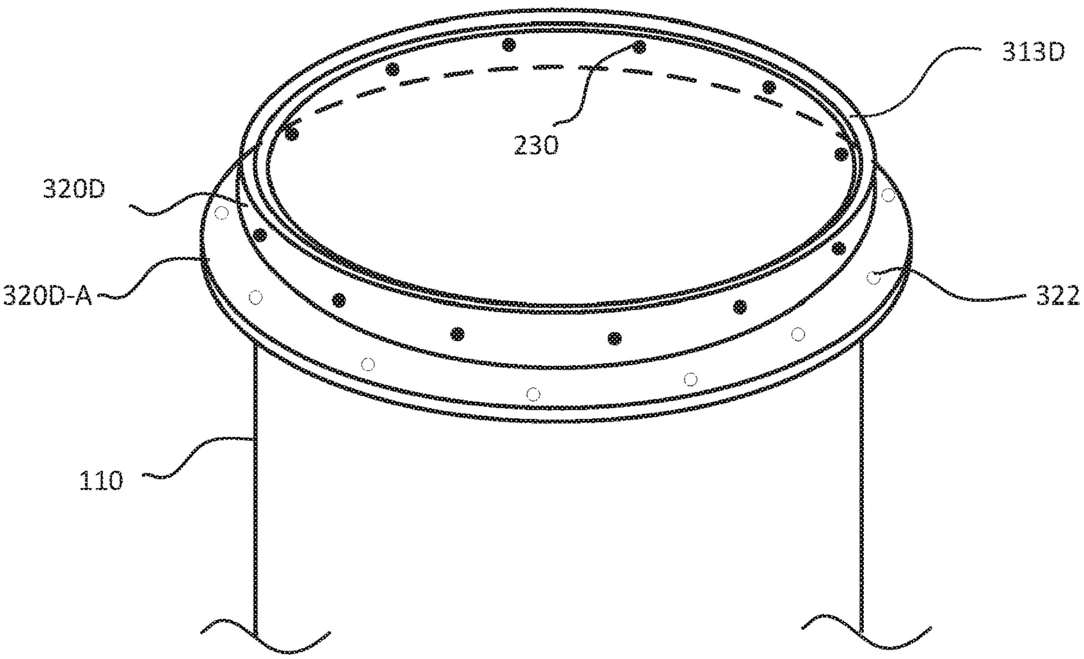
FIGS. 7C-7H illustrate an L-shaped insert according to examples of the disclosure.
Figure 7D:
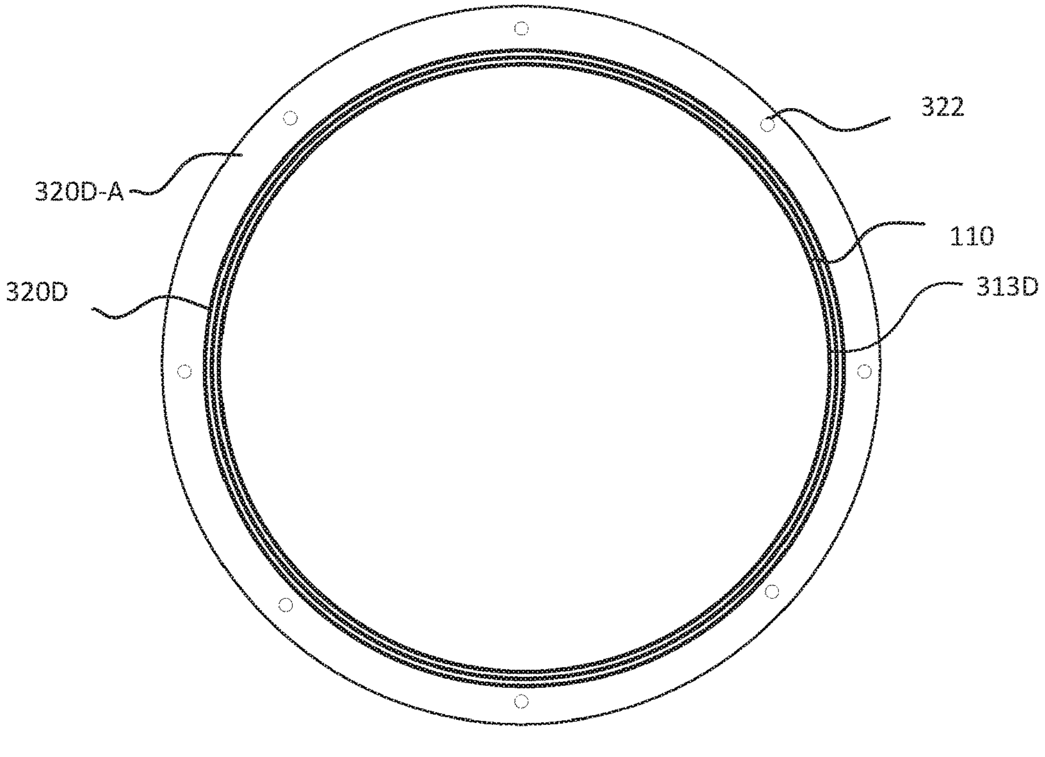

FIGS. 7C-7H illustrate an L-shaped insert according to examples of the disclosure. FIG. 7C shows a perspective view of drum 100, including shell 110, insert 320D having a lower portion 320D-A extending out horizontally relative to shell 110 (e.g., as described above with reference to FIG. 3D), fasteners 230, and threaded inserts 322. In addition, lower portions 320D-A which are not visible from the perspective view are indicated by a dashed line. For clarity, other elements of drum 100 are omitted. Insert 320D can be formed, for example, by rolling a solid L-shaped bar of metal end-to-end, and attaching the two ends of the bar (including lower portion 320D-A) forming the insert together. In some examples, the ends of the bar forming insert 320D (including lower portion 320D-A) can be connected by welding or brazing the bar at the seam between the two ends. Moreover, though not shown here, in other examples, drum 100 can include a second insert 320D (optionally including a top portion extending out horizontally relative to shell 110) at the bottom of drum 100. FIG. 7D shows a top view of shell 110 and insert 320D with lower portion 320D-A extending out horizontally relative to shell 110. For clarity, other elements of drum 100 are omitted.

Figure 7E:
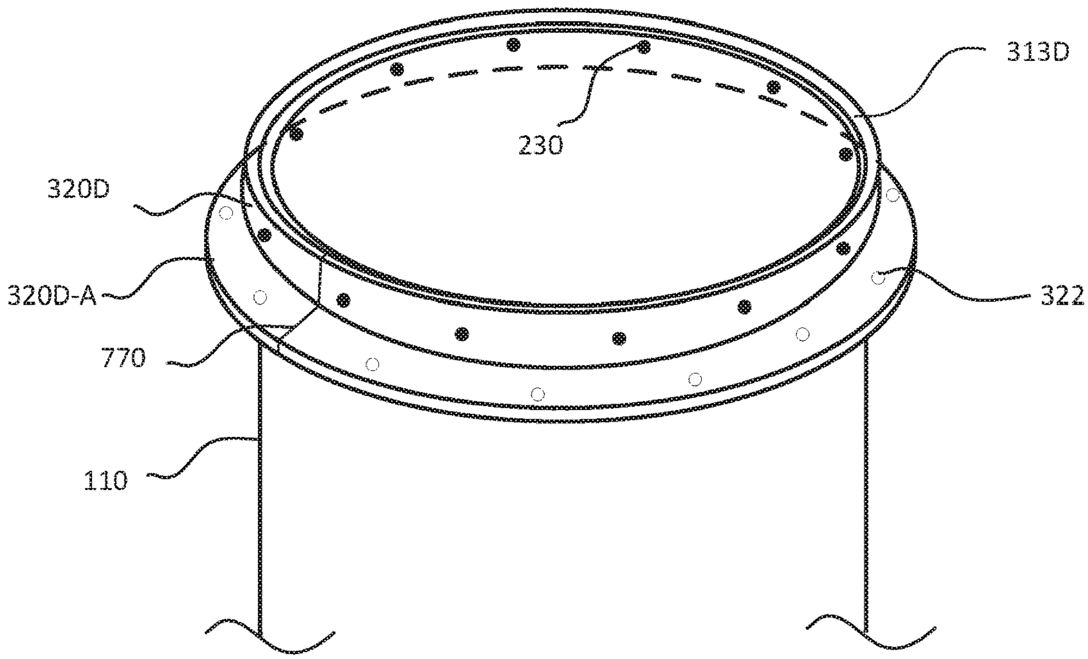
Figure 7F:
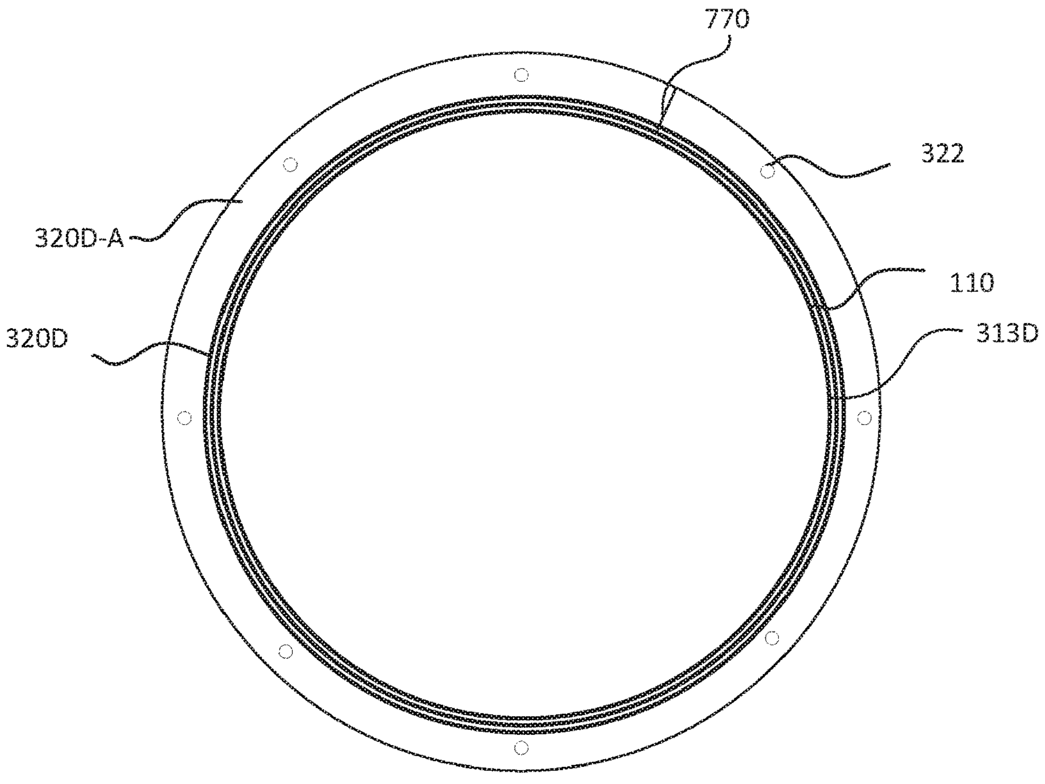

FIGS. 7E-7F illustrate another example of a drum insert, wherein the insert forms a ring having a break according to examples of the disclosure. FIG. 7E illustrates a perspective view of insert 320D, and FIG. 7F illustrates a top view. Each point of insert 320D can be curved with a radius R1 (not shown), approximately equal to the outer radius of a shell. Insert 320D can be similar to the insert illustrated in FIGS. 7C-7D in that insert 320D can include a beveled edge 313D and lower portion 320D-A extending out horizontally relative to shell 110. However, rather than the insert forming a continuous ring, insert 320D can include a break 770 having a distance D1 (not shown). It should be noted that distance D1 of break 770 can range from 0 (i.e., when the ends are touching) to approximately 3 centimeters. In some configurations, distance D1 of break 770 can be greater than 1 millimeter. In some configurations, the inner circumference of insert 320D can match the outer circumference of shell 110 such that the two ends of insert 320D are in contact with one another, but are not joined (e.g., by a method such as welding or brazing). In other configurations, break 770 can comprise a gap such that the two ends of insert 320D are not in contact with one another. In some circumstances, having a break in the insert 320D can simplify the manufacturing process by, for example, eliminating the additional step of joining the ends of the insert together and, in some examples, making the insert easier to position outside of the shell. The insert 320D configuration described with reference to FIGS. 7E-7F can be beneficial, for example, where inserts are utilized primarily or additionally for tone control, rather than primarily for reinforcement of the shell (e.g., drums in which a metal shell is sufficiently strong without reinforcement rings).

In some examples, rather than a single insert as shown in the examples of FIGS. 7E-7F, a plurality of insert sections can be attached to a shell, each separated from one another by a break 770. In such a configuration, each insert section 320D can be curved with a radius R1 (not shown) approximately equal to the outer radius of the shell. Each insert section 320D can be separated by a break having a distance D2 (not shown), though in other configurations, the distances between insert sections may not be uniform. In addition, in some examples, the distance between one or more of insert sections 320D can be zero, that is, insert sections 320D can be touching one another without being joined (e.g., using welding or brazing). In other examples, the distance D2 (not shown) between one or more insert sections 320D can be greater, for example, ranging from 1 millimeter to 3 centimeters. As with the example of FIGS. 6A-6B, configurations which utilize multiple inserts can simplify the manufacturing process by, for example, eliminating the step of joining inserts together. Moreover, insert sections can be more easily positioned onto a shell than examples utilizing a single insert joined to make a continuous ring, as in the examples of FIGS. 7C-7D. Further, as with the example of FIGS. 6A-6B, the relatively small possible size of insert sections configurations can also simplify the manufacturing process.

Figure 7G:
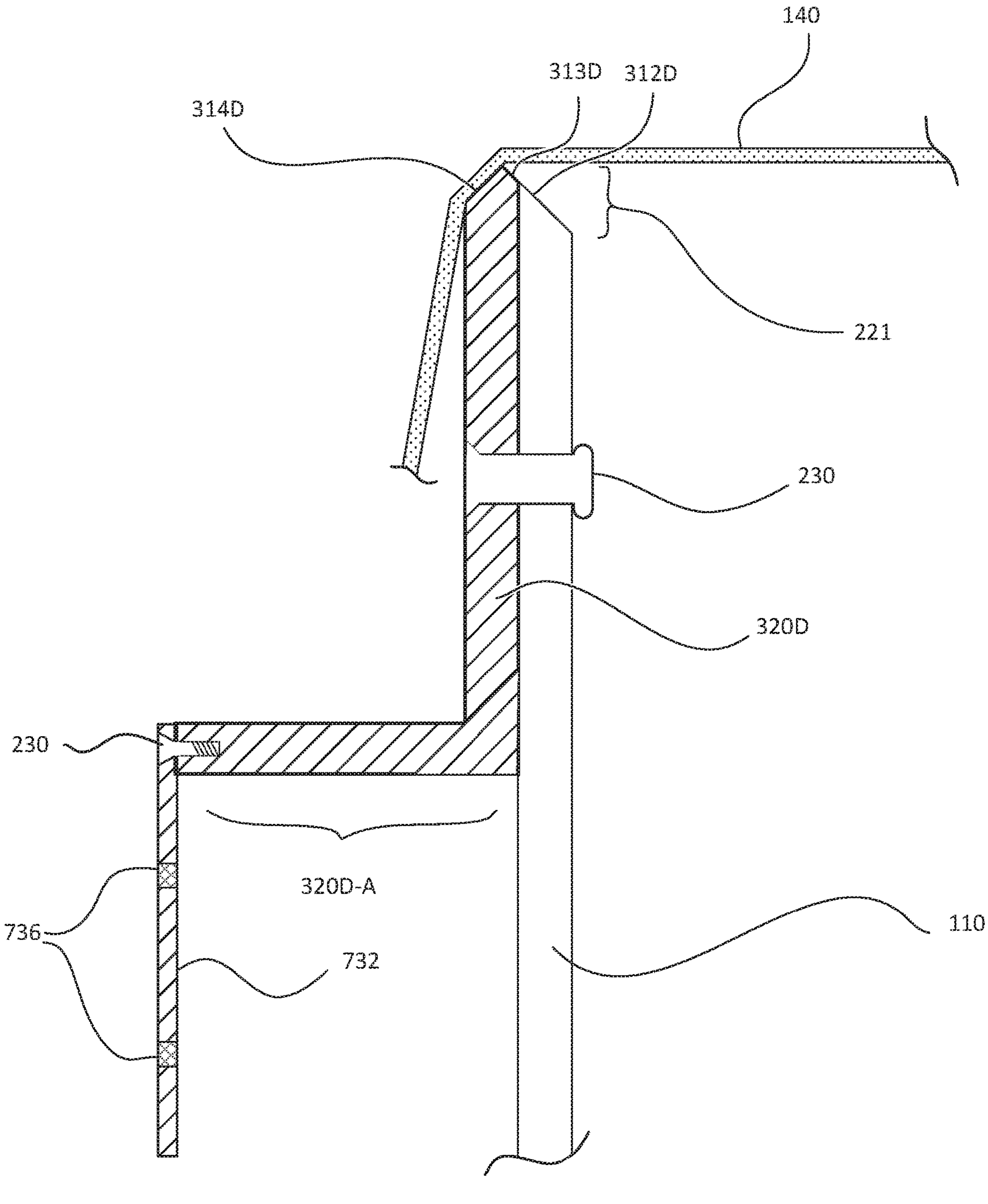

FIG. 7G illustrates a cross-sectional view of a section of an example drum along a plane perpendicular to the head surface extending radially from the center of the drum according to examples of the disclosure. As illustrated, in this configuration, insert 320D includes lower portion 320D-A extending out horizontally as in the configurations described above with reference to FIGS. 3D and 7C-7F. In the configuration shown in FIG. 7G, an adapter plate 732 for a mounting bracket (not shown) is coupled to lower portion 320D-A of insert 320D via one or more fasteners 230 (e.g., rivets, screws, and/or the like). In some examples, adapter plate 732 is coupled to lower portion 320D-A of insert 320D via other means (e.g., using welding, brazing, or adhesive). In some examples, as illustrated in FIG. 7E, adapter plate 732 can include one or more holes 736. In some examples, holes 736 can be threaded. In some examples, adapter plate 732 can be coupled to a bracket for mounting drum 100 (e.g., on a stand, strap, or any other external assembly). In some examples, insert 320D can be continuous or discontinuous (e.g., include a break or gap) (not shown), as described above with reference to FIGS. 7C-7F.

Figure 7H:
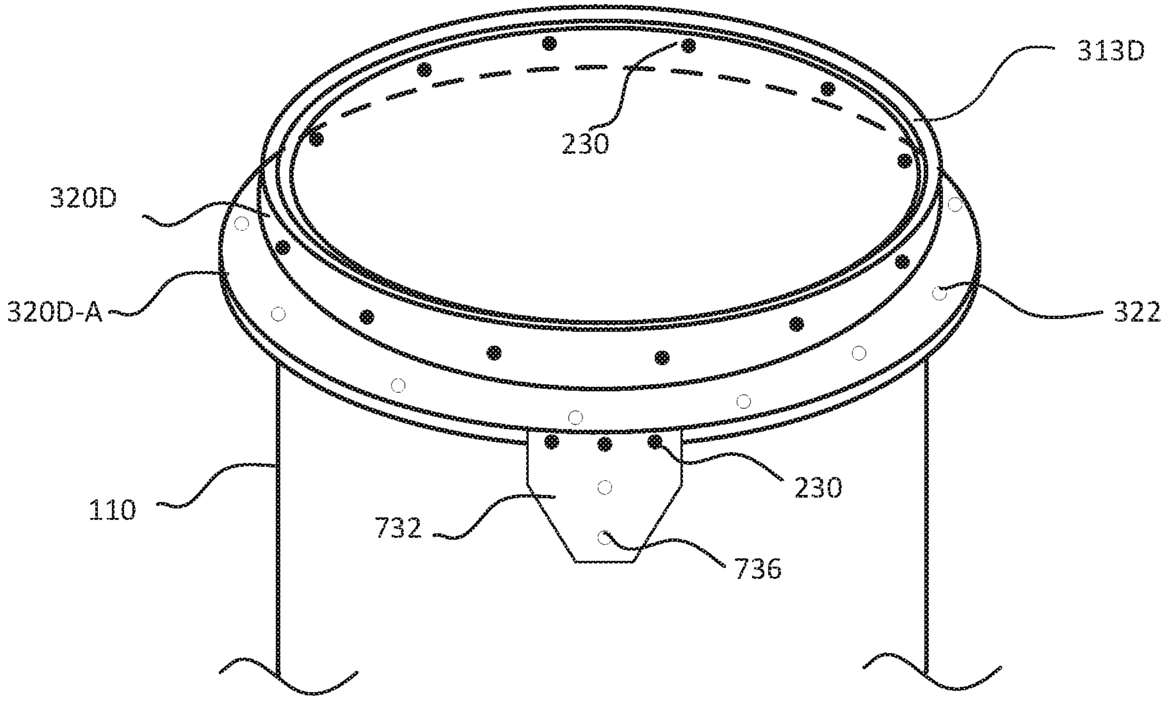

FIG. 7H shows a perspective view of drum 100, including shell 110, adapter plate 732 with holes 736, insert 320D (or insert sections) with lower portion 320D-A extending out horizontally (e.g., as described above with reference to FIGS. 3D and 7C-7G), fasteners 230, and threaded inserts 322. For clarity, other elements of drum 100 are omitted. In addition, lower portions 320D-A, which are not visible from the perspective view, are indicated by dashed lines. In some examples, adapter plate 732 can have other configurations (e.g., can have a saw tooth pattern for mounting, can be other shapes including square, rectangle, or other polygonal shapes, or can be a mounting bracket). In some examples, insert 320D can be continuous (shown) or discontinuous (e.g., include a break or gap) (not shown), as described above with reference to FIGS. 7C-7G.

Figure 8A:
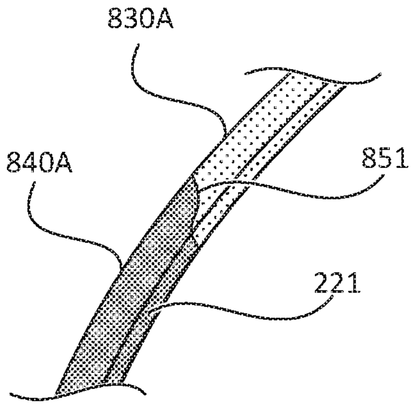
FIGS. 8A-8D illustrate example configurations where ends are in contact with one another according to examples of the disclosure.
Figure 8B:
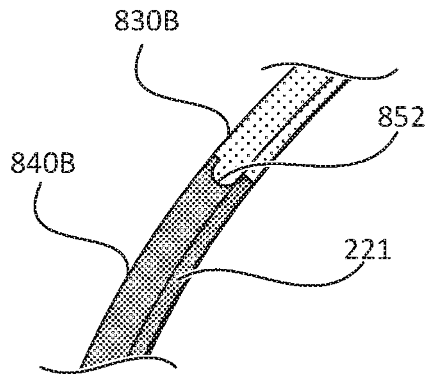
Figure 8C:
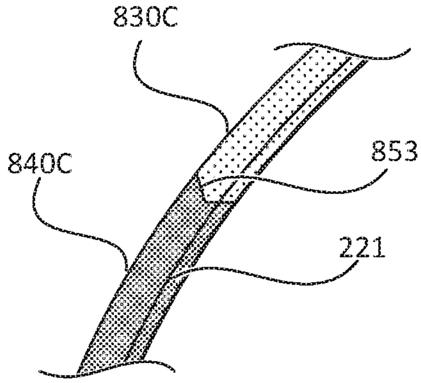
Figure 8D:
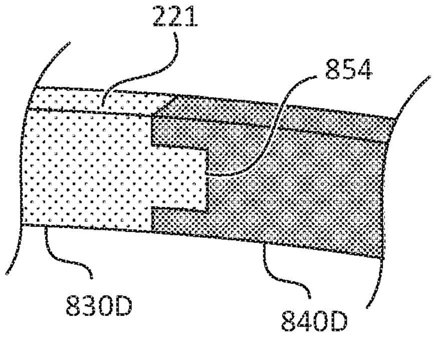

As mentioned above, in examples where two ends of an insert (e.g., two ends of insert 520 of FIGS. 5A-5B, two ends of insert sections 630 in FIGS. 6A-6B, or two ends of insert 320D of FIGS. 7E-7F) are in contact with one another, one end of an insert section can (but need not) be formed as to be in contact with another end of the insert section or with an end of another insert section. FIGS. 8A-8D illustrate example configurations where first and second ends are in contact with one another according to examples of the disclosure. FIGS. 8A-8C illustrate a top view of a segment of an insert wherein first and second ends are joined via a joint along edges of the insert. FIG. 8D illustrates a perspective view of a segment of an insert wherein first and second ends are joined via a joint along the face of the insert. In each configuration shown, a first end 830A-830D can correspond, for example, to a first end of insert 520 of FIGS. 5A-5B, an end of an insert section 630 in FIGS. 6A-6B, or a first end of insert 320D of FIGS. 7E-7F. Likewise, a second section end 840A-840D can correspond, for example, to a second end of insert 520 in FIGS. 5A-5B, an end of a different section 630 in FIGS. 6A-6B, or a second end of insert 320D of FIGS. 7E-7F. As shown in FIGS. 8A-8D, each insert can include a shaped edge 221. As shown in FIG. 8A, in some examples, first end 830A can be joined with second end 840A via a rabbet joint 851. As shown in FIG. 8B, in other examples, first end 830B can be joined with second end 840B via a tongue and groove joint 852. In other examples such as that shown in FIG. 8C, first end 830C can be joined with second end 840C via a V joint 853. In the examples explained with reference to FIGS. 8A-8C, joints can be formed along edges of the two ends. As shown in FIG. 8D, in some examples, joints can be formed along the face of the sections or insert ends. For example, FIG. 8D illustrates a first end 830D joined with a second end 840D via a tongue and groove joint 854 along the face of the first and second ends. The above examples can be beneficial, for example, to more easily fit and align the insert ends (or insert sections) together. It should be understood that the joints 851-854 shown in FIGS. 8A-8D are exemplary only, and the scope of this disclosure contemplates other types of joints including, but not limited to, dovetail joints, lap joints, butt joints, and the like.

Exemplary processes for manufacturing the example configurations detailed above will now be described with reference to FIGS. 9-11 below.

Figure 9:
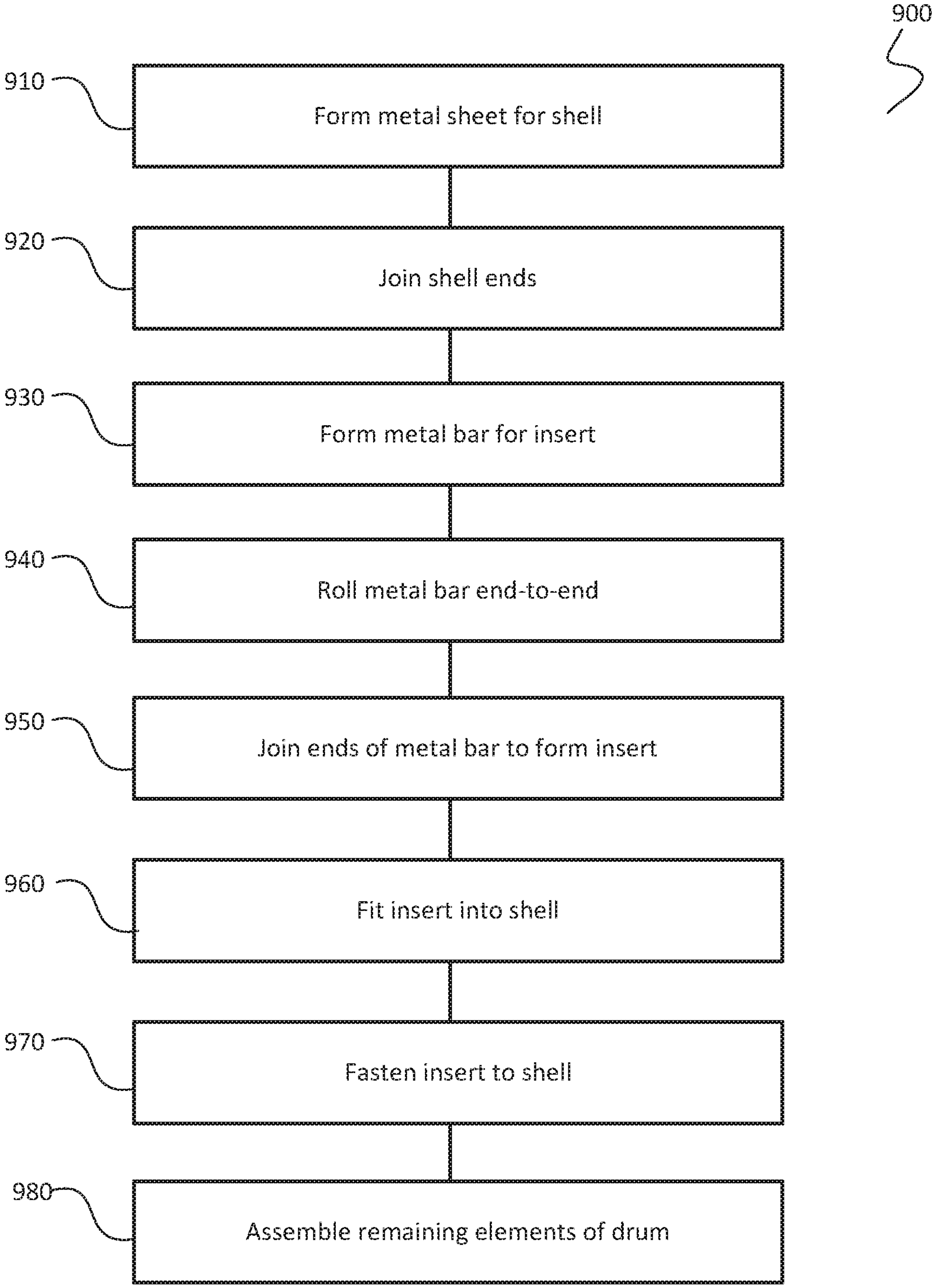
FIG. 9 illustrates an exemplary process for manufacturing a drum having a shell and insert corresponding to FIGS. 4A-4B above, wherein an insert forms a single continuous ring.

FIG. 9 illustrates an exemplary process for manufacturing a drum having a shell and insert corresponding to FIGS. 4A-4B and/or 7C-7D above, wherein insert 320D and/or 420 forms a single continuous ring. In some examples, a drum shell 110 is first formed having a shaped (e.g., beveled or rounded) shell 110, which can form a portion of a bearing edge (e.g., the portion 413 of insert 420 shown in FIGS. 4A-4B above and/or the portion 313D of insert 320D shown in FIGS. 7C-7D above) on a top edge of a shell, bottom edge of a shell, or both as indicated in step 910. The shell 110 can be formed by rolling a rectangular sheet of metal end-to-end to form a cylinder. The ends of the sheet of metal can then be joined to complete the cylinder, for example, by welding or brazing as indicated in step 920. In some examples, the shaped edge or edges on the cylinder forming the shell 110 can be added prior to forming the metal into a cylinder, using for example, a router, grinder, or the like. Additionally or alternatively, the beveled edge or edges on the cylinder can be formed when the rectangular sheet of metal is cut into shape, for example, using a sheet metal shear or the like.

The insert can be formed as indicated in steps 930-950 of FIG. 9. In some examples, the insert can include one or more shaped (e.g., beveled or rounded) edges (e.g., portion 313A of insert 220 shown in FIG. 3A). As indicated in step 930, the metal bar which will make up the insert can be formed. As indicated in step 940, the metal bar can be rolled end-to-end. In some examples, the shaped edges of the insert can be formed prior to rolling the metal bar into the ring. For example, the metal bar forming the ring can be extruded through a die with a profile having the desired shaped edges, saving manufacturing steps and reducing wasted material. In other examples, the metal bar forming the ring can be formed using a casting process. Additionally or alternatively, shaped edges on the metal bar forming the ring can be formed using a router, grinder, or the like. In some examples, the using a soft metal, such as aluminum, to form the insert can reduce manufacturing costs, as soft metals can be shaped and cut using less expensive manufacturing processes. The metal bar can be joined at the ends to complete the ring to form the insert, for example, by welding or brazing as indicated in step 950. In some examples, the shaped edge or edges of the insert can be formed (e.g., routed) after the metal bar is rolled into a ring and joined at the ends. In some examples, the metal bar can be an L-shaped bar (e.g., have a portion extending in a vertical direction and another portion extending in the horizontal direction, as described with reference to insert 320D of FIGS. 3D and 7C-7H above).

Next, the insert formed in steps 930-950 can be fastened to drum shell 110 formed in steps 910-920, as indicated in step 960. In some examples, the insert can form a continuous ring having a diameter matching that of an inner-surface of shell 110, the insert can be first press fit into the shell, and optionally, temporarily clamped in place. In some examples, the insert can have a diameter matching that of an outer-surface of shell 110, the insert can be first press fit onto the shell, and optionally, temporarily clamped in place. In some examples, holes 430 can be elongated as explained above with reference to FIGS. 7A-7B above, and the insert can be adjusted with fasteners in place before fasteners are securely tightened. In some examples, holes 430 for fasteners can be drilled through both the shell and insert, and optionally be countersunk and deburred. Holes 430 can have approximately equal spacing (e.g., 2.5 inches) around the circumference of the shell and insert. In some examples, rivets (e.g., aircraft-grade aluminum rivets) can be utilized in conjunction with the holes to securely fasten the insert to the shell as indicated in step 970. In other configurations, a combination of nuts, bolts, and/or screws can be utilized to fasten the insert to the shell, including configurations in which the holes are threaded. It should be understood that other fastening means can be utilized (e.g., welding, brazing, or adhesive), but the configurations described above can be beneficial, for example, when the shell and insert are formed of dissimilar metals. In some examples, the shaped edge or edges on the cylinder forming the shell 110 and the shaped edges on the insert can be formed after the insert is fastened to the shell using, for example, a router, grinder, or the like.

Next, the remaining elements of the drum can be assembled, as indicated in step 980. This step may include assembling, for example, the drum heads 140, hoops 150, tension rods 162, and lugs 160 shown in FIG. 1. In some examples, this step may include assembling hoops 150 to insert 320D via tension rods 162 and threaded inserts 322 as shown in FIG. 3D. In some examples, this step may further include coupling an adapter plate 732 to insert 320D via one or more fasteners 230 as shown in FIGS. 7G-7H.

Figure 10:
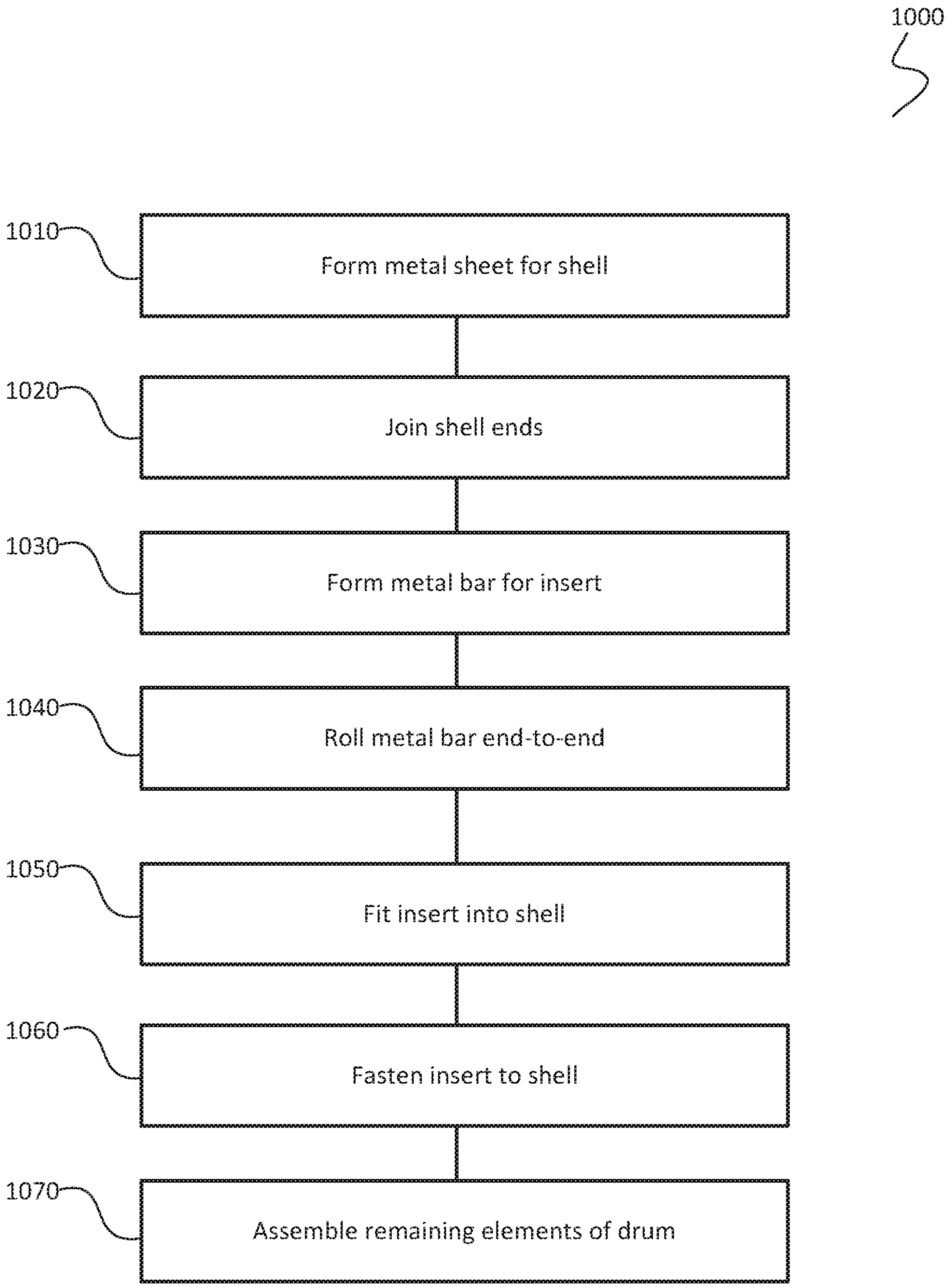
FIG. 10 illustrates an exemplary process for manufacturing a drum having a shell and insert corresponding to FIGS. 5A-5B above, wherein an insert forms a ring having a break.

FIG. 10 illustrates an exemplary process for manufacturing a drum having a shell and insert, wherein the insert forms a ring having a break, corresponding to the insert described with reference to FIGS. 5A-5B and 7E-7F above. In some examples, a metal sheet for the drum shell is formed as indicated in step 1010. The ends of the metal sheet can be joined by, for example, welding or brazing to form drum shell 110 as indicated in step 1020. The details of this step can substantially match those of steps 910-920, described above with reference to FIG. 9.

The insert can be formed, as indicated in step 1030-1040 of FIG. 10. The steps of forming and shaping of the insert in this configuration can substantially match those of steps 930-940 described with reference to FIG. 9 above, including forming the insert to have a shaped edge 221. However, unlike the configuration above, the ends of the insert in this configuration are not joined together (e.g., by welding or brazing) as in step 950 of FIG. 9. Instead, as discussed above with reference to FIGS. 5A-5B and 7E-7F, the two ends can be separated by a distance or in contact with one another.

Next, the metal insert formed in steps 1030-1040 can be fit into drum shell 110 formed in steps 1010-1020, as indicated in step 1050. In configurations where the distance D1 between the two ends of insert 520 are in contact with one another, the insert can be first press fit into or onto the shell, as similarly described with reference to step 960 in FIG. 9 above. As also described with reference to FIGS. 5A-5B and/or FIGS. 7E-7F, in other examples the distance between the two ends of the insert (e.g., the distance D1 of FIG. 5B) can be greater than zero, that is, the ends are not in contact. It should be appreciated that in these configurations, the distance between the ends of the insert can allow the insert to flex slightly in a circumferential direction (such that the radius of the insert is momentarily reduced) while the ends of the insert are pushed toward one another. As such, in step 1050, the insert can be easily positioned in shell 110 while the ends are held together. In some configurations, the insert can be formed (e.g., rolled) to have a radius slightly larger than the inner radius R1 of shell 110 such that, when the insert is positioned inside the shell it is held in place by an outward radial force exerted by the insert against the inner surface of the shell. This can be beneficial for easily positioning the insert prior to fastening it to shell 110. In other examples, the insert can be formed (e.g., rolled) to have a radius slightly smaller than the inner radius R1 of shell 110, such that the insert easily fits inside the shell, and the radius of the insert is expanded to be equal to R1 during the fastening process. In some examples, the insert can be formed (e.g., rolled) to have a radius slightly larger than the outer radius of shell 110 such that the insert can be positioned on the outer surface of the shell. In some examples, the insert can be temporarily clamped into place in shell 110. The insert can be then fastened to the shell in step 1060 using substantially the same methods described with reference to step 970 in FIG. 9 above. In some examples, holes 730 can be elongated as explained above with reference to FIGS. 7A-7B above, and the insert can be adjusted with fasteners in place before fasteners are securely tightened. In some examples, the shaped edge or edges on the cylinder forming the shell 110 and the shaped edges on the insert can be formed after the insert is fastened to the shell using, for example, a router, grinder, or the like.

Next, the remaining elements of the drum can be assembled, as indicated in step 1070. This step may include assembling, for example, the drum heads 140, hoops 150, tension rods 162, and lugs 160 shown in FIG. 1. In some examples, this step may include assembling hoops 150 to insert 320D via tension rods 162 and threaded inserts 322 as shown in FIG. 3D. In some examples, this step may further include coupling as adapter plate 732 to insert 320D via one or more fasteners 230 as shown in FIGS. 7G-7H.

Figure 11:
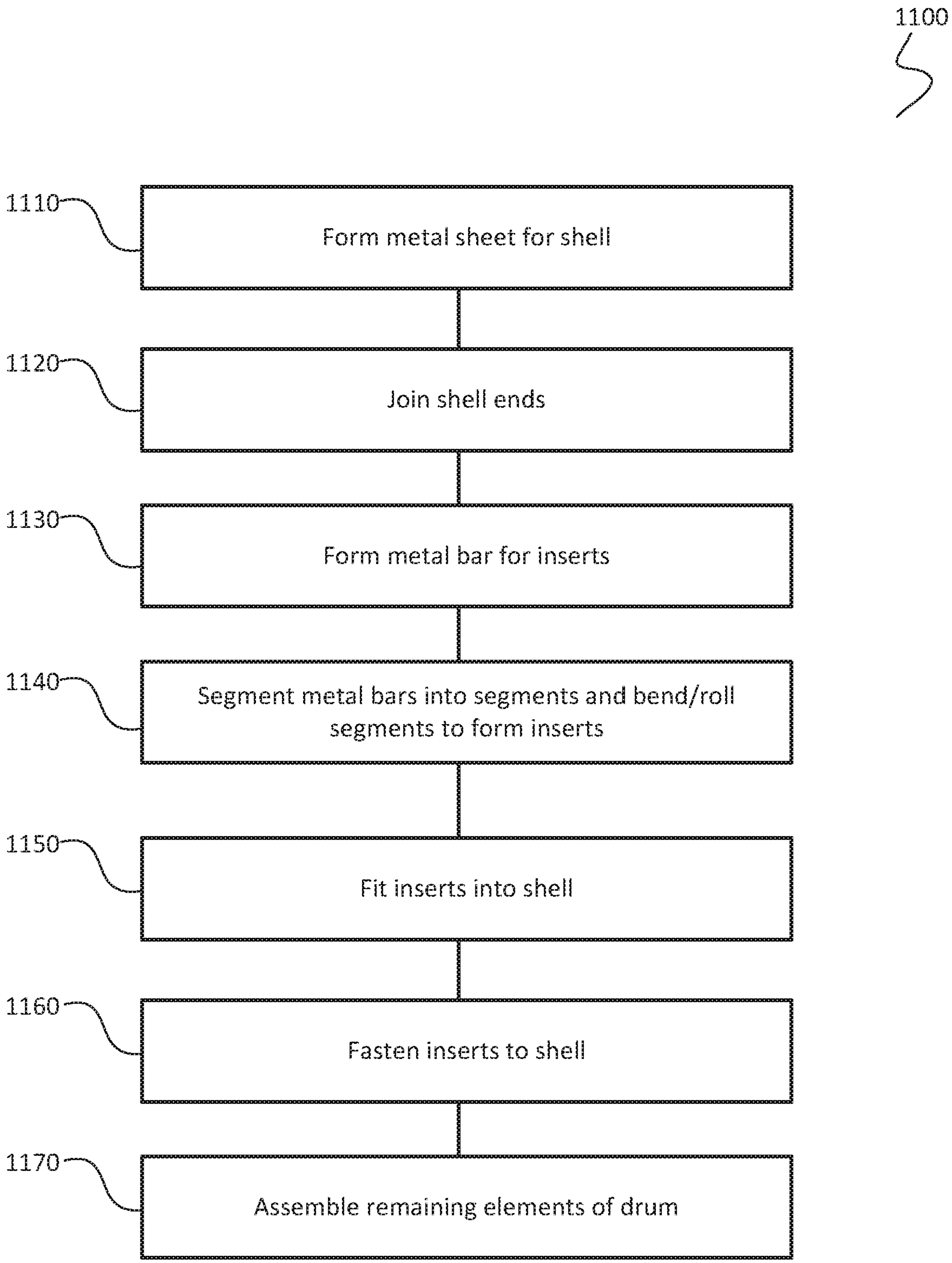
FIG. 11 illustrates an exemplary process for manufacturing a drum having a shell and inserts corresponding to FIGS. 6A-6B above, wherein the inserts collectively form a ring having a plurality of breaks.

FIG. 11 illustrates an exemplary process for manufacturing a drum having a shell 110 and insert sections 620 corresponding to FIGS. 6A-6B above, wherein insert sections 620 collectively form a ring having a plurality of breaks 672. In some examples, drum shell 110 is first formed as indicated in steps 1110 and 1120, wherein a metal sheet is formed, and the two ends of the metal sheets are joined to form the shell. The details of this step can substantially match those of steps 910-920, described above with reference to FIG. 9.

Insert sections 620 can be formed, as indicated in steps 1130-1140 of FIG. 11. In some examples, the steps of forming and shaping of insert sections 620 in this configuration can substantially match those of step 1030-1040, respectively, described with reference to FIG. 10 above, including forming the insert to have a shaped edge 221. However, rather than rolling a single metal bar end-to-end to form a single ring, the metal bar can be segmented into a plurality of smaller metal bars. Each of the plurality of smaller metal bars (e.g., insert sections 620 shown in FIGS. 6A-6B) can each be rolled to have a radius approximately equal to the radius of the shell (i.e., radius R1) as indicated in step 1140. In some configurations where each insert section 620 is of a relatively short length, the curve in each insert can be formed using methods other than rolling, for example, using a press and a die having the desired curvature. Moreover, in some examples, the desired curvature can be formed during an extrusion process. In other examples, the insert sections can be formed using a casting process. Still in other examples, inserts can be formed by rolling a single metal bar end-to-end as in step 1040 of FIG. 10, and subsequently separating the ring into individual insert sections.

Next, insert sections 620 formed in steps 1130-1140 can be fit into drum shell 110 formed in steps 1110-1120, as indicated in step 1150. In some examples, insert sections 620 can be temporarily clamped into place in the shell. As indicated in step 1160, insert sections 620 forming an insert can be then fastened to shell 110 using substantially the same methods described with reference to step 1060 in FIG. 10 above. In some examples, holes 730 can be elongated as explained above with reference to FIGS. 7A-7B above, and the insert can be adjusted with fasteners in place before fasteners are securely tightened. In some examples, the shaped edge or edges on the cylinder forming the shell 110 and the shaped edges on the insert can be formed after the insert is fastened to the shell using, for example, a router, grinder, or the like.

Next, the remaining elements of the drum can be assembled, as indicated in step 1170. This step may include assembling, for example, the drum heads 140, hoops 150, tension rods 162, and lugs 160 shown in FIG. 1.

In some examples, the fit tolerances between the shell and the insert or insert sections can be lower in configurations where inserts include one or more breaks (e.g., the insert shown in FIGS. 5A-5B, the insert sections shown in FIGS. 6A-6B, and/or the insert shown in FIGS. 7E-7F). For example, in the manufacturing processes set forth with respect to FIGS. 10 and 11 above (corresponding to the configurations of FIGS. 5A-5B, 6A-6B, and 7C-7H), breaks between ends of inserts or insert sections can account for slight variations in length of insert or insert sections. As discussed above with respect to FIG. 3A, in configurations where the insert forms only the lower portion of a bearing edge (i.e., a portion not in contact with a drum head), slight gaps in insert ends (or slight variations in distance between insert sections) can have only negligible effects on the tone of the drum.

With respect to steps of fastening set forth above, it should be understood that in other configurations, holes can be drilled before the insert is positioned inside the shell, including configurations where holes are drilled in the shell and/or insert before these pieces are rolled into shape.

Although not shown in the processes set forth above, the processes of forming the shell and insert in this configuration may further include steps to alter the aesthetics of the shell and/or insert. For example, these steps may include, but are not limited to, polishing, painting, powder coating, and anodizing. In some examples, these steps can be performed on the shell and/or insert prior to fastening the shell and insert together. Thus, treatments conducive to a certain type of metal (e.g., aluminum anodization) can be performed separately where elements are formed of different metals.

According to the above, some examples of the disclosure are directed to an element of an acoustic drum comprising: a hollow cylindrical shell formed of a first metal, wherein the shell has a first radius extending perpendicular to a first dimension and the shell includes a top edge at a top opening; and an insert formed of a second metal, wherein the insert has a curve of the first radius, and the insert is fastened to the shell such that the insert is further from the top opening than the top edge of the shell in the first dimension. Additionally or alternatively to one or more of the examples disclosed above, in some examples: the top edge of the shell includes an inner shell edge; and the insert includes an insert edge such that the inner shell edge and insert edge together form a continuous inner edge. Additionally or alternatively to one or more of the examples disclosed above, in some examples: the top edge of the shell includes an outer edge, the outer edge and inner edge together forming a bearing edge of the element. Additionally or alternatively to one or more of the examples disclosed above, in some examples, the element further comprises a second insert, wherein: the shell further includes a bottom opening having a bottom edge; and the second insert is positioned further from the bottom opening than the bottom edge in the first dimension. Additionally or alternatively to one or more of the examples disclosed above, in some examples: the insert comprises continuous a ring of the second metal having the curve of the first radius. Additionally or alternatively to one or more of the examples disclosed above, in some examples: the insert comprises a discontinuous ring of the second metal having the curve of the first radius and having first and second ends. Additionally or alternatively to one or more of the examples disclosed above, in some examples: the first and second ends are separated by a distance of at least one millimeter. The element of claim 1, the insert further comprising: a plurality of insert sections, wherein the plurality of insert sections collectively form a discontinuous ring having the first radius. Additionally or alternatively to one or more of the examples disclosed above, in some examples, the first metal is different from the second metal. Additionally or alternatively to one or more of the examples disclosed above, in some examples: the insert is fastened to the shell through a plurality of holes and each hole is elongated as to allow the insert to be adjusted in the first dimension.

Some examples of the disclosure are directed to a method to manufacture elements of an acoustic drum, comprising: forming a shell of a sheet of a first metal; forming a top shell edge of the shell including an inner shell edge; forming an insert of a bar of a second metal; forming an insert edge of the insert; and fastening the insert to the shell below the top edge such that the top edge and insert edge form a single continuous inner edge. Additionally or alternatively to one or more of the examples disclosed above, in some examples: forming the insert includes extruding the second metal into a bar, where the insert edge is formed during the extruding. Additionally or alternatively to one or more of the examples disclosed above, in some examples: forming the insert comprises rolling the bar to have a curve of a radius equal to a radius of the shell to form a discontinuous ring. Additionally or alternatively to one or more of the examples disclosed above, in some examples: ends of the bar are separated by a distance of at least one millimeter. Additionally or alternatively to one or more of the examples disclosed above, in some examples, the method further comprises: forming a plurality of insert sections of a plurality of bars of the second metal, the plurality of insert sections including forming the insert and the plurality of bars including the bar of the second metal, wherein the plurality of insert sections are fastened to the shell as to collectively form a discontinuous ring. Additionally or alternatively to one or more of the examples disclosed above, in some examples: the plurality of insert sections have a curve of a radius equal to a radius of the shell and wherein the curve is pressed into the insert using a press. Additionally or alternatively to one or more of the examples disclosed above, in some examples: the plurality of insert sections are formed by extruding the second metal, and during the extrusion, the plurality of insert sections are formed as to have a curve of a radius equal to a radius of the shell. Additionally or alternatively to one or more of the examples disclosed above, in some examples: the first metal is different from the second metal.

Some examples of the disclosure are directed to an element of an acoustic drum comprising: a hollow cylindrical shell formed of a first metal, wherein the shell has a first radius extending perpendicular to a first dimension and the shell includes a top edge at a top opening; and an insert formed of a second metal comprising a discontinuous ring having a first and second end, wherein the insert has a curve of the first radius, and the insert is fastened to the shell. Additionally or alternatively to one or more of the examples disclosed above, in some examples: the insert is fastened to the shell such that the insert is nearer to the top opening than to the top edge of the shell in the first dimension. Additionally or alternatively to one or more of the examples disclosed above, in some examples: the insert includes an inner insert edge; and the top edge of the shell includes an inner shell edge such that the inner insert edge and inner shell edge together form a continuous inner edge. Additionally or alternatively to one or more of the examples disclosed above, in some examples: the insert includes an outer insert edge, the outer insert edge, inner insert edge, and inner shell edge together forming a bearing edge. Additionally or alternatively to one or more of the examples disclosed above, in some examples: the insert includes an outer insert edge and an inner insert edge, the outer insert edge and inner insert edge together forming a bearing edge. Additionally or alternatively to one or more of the examples disclosed above, in some examples: the insert includes a recess configured to be in contact with the top edge and an upper outer portion of the shell at the top opening. Additionally or alternatively to one or more of the examples disclosed above, in some examples: the insert is fastened to the shell through a plurality of holes and each hole is elongated as to allow the insert to be adjusted in the first dimension. Additionally or alternatively to one or more of the examples disclosed above, in some examples: the insert is formed from an L-shaped bar of the second metal; and the insert includes a lower portion extending out horizontally relative to the shell. Additionally or alternatively to one or more of the examples disclosed above, in some examples: an adapter plate coupled to the lower portion of the insert for mounting.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An element of an acoustic drum comprising:

a hollow cylindrical shell formed of a first metal, wherein the shell has a first radius extending perpendicular to a first dimension and the shell includes a top edge at a top opening, wherein the top edge of the shell includes an inner shell edge; and an insert formed of a second metal, wherein the insert has a curve of the first radius, the insert is fastened to the shell such that the insert is further from the top opening than the top edge of the shell in the first dimension, and the insert includes an insert edge such that the inner shell edge and insert edge together form a continuous inner edge.

2. The element of claim 1, wherein:

the top edge of the shell includes an outer edge, the outer edge of the shell and the continuous inner edge together forming a bearing edge of the element.

3. The element of claim 2, further comprising:

a drum head stretched over the top edge of the shell such that the drum head does not make contact with the insert.

4. The element of claim 1 further comprising a second insert, wherein:

the shell further includes a bottom opening having a bottom edge; and the second insert is positioned further from the bottom opening than the bottom edge in the first dimension.

5. The element of claim 1, wherein:

the insert comprises a continuous ring of the second metal having the curve of the first radius.

6. The element of claim 1, wherein:

the insert comprises a discontinuous ring of the second metal having the curve of the first radius and having first and second ends.

7. The element of claim 6, wherein:

the first and second ends are separated by a distance between one millimeter and three centimeters.

8. The element of claim 1, wherein the first metal is different from the second metal.

9. A method to manufacture elements of an acoustic drum, comprising:

forming a hollow cylindrical shell of a sheet of a first metal;

forming a top shell edge of the shell including an outer shell edge and an inner shell edge;

forming an insert of a bar of a second metal;

forming an insert edge of the insert; and fastening the insert to the shell below the top edge such that the inner shell edge and insert edge form a continuous inner edge.

10. The method of claim 9, wherein:

forming the insert comprises rolling the bar to have a curve of a radius equal to a radius of the shell to form a discontinuous ring.

11. The method of claim 10, wherein:

ends of the bar are separated by a distance between one millimeter and three centimeters.

12. The method of claim 9, wherein:

the first metal is different from the second metal.

13. An element of an acoustic drum comprising:

a hollow cylindrical shell formed of a first metal, wherein the shell has a first radius extending perpendicular to a first dimension and the shell includes a top edge at a top opening; and an insert formed of a second metal comprising a ring having a curve of the first radius, and the insert is fastened to the outside of the shell.

14. The element of claim 13, wherein:

the insert is fastened to the shell such that the insert is nearer to the top opening than to the top edge of the shell in the first dimension.

15. The element of claim 14, wherein:

the insert includes a top insert edge comprising an inner insert edge and an outer insert edge; and the top edge of the shell includes an inner shell edge such that the inner insert edge and inner shell edge together form a continuous inner edge.

16. The element of claim 15, wherein:

the outer insert edge and the continuous inner edge together forming a bearing edge.

17. The element of claim 13, wherein:

the insert includes an outer insert edge and an inner insert edge, the outer insert edge and inner insert edge together forming a bearing edge.

18. The element of claim 16, wherein:

the insert includes a recess configured to be in contact with the top edge and an upper outer portion of the shell at the top opening.

19. The element of claim 13, wherein:

the insert is formed from an L-shaped bar of the second metal; and the insert includes a lower portion extending out relative to the shell.

20. The element of claim 19, further comprising:

an adapter plate coupled to the lower portion of the insert for mounting.

* * * * *